United States Patent
Klish, II

(10) Patent No.: US 7,840,712 B2
(45) Date of Patent: *Nov. 23, 2010

(54) HYBRID INTERNET PROTOCOL ENCRYPTOR/DECRYPTOR BYPASS DEVICE

(75) Inventor: Cypryan T. Klish, II, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 873 days.

This patent is subject to a terminal disclaimer.

(21) Appl. No.: 11/744,005

(22) Filed: May 3, 2007

(65) Prior Publication Data

US 2008/0273462 A1    Nov. 6, 2008

(51) Int. Cl.
  *G06F 15/16*    (2006.01)
  *G06F 15/173*   (2006.01)

(52) U.S. Cl. .................. 709/249; 709/247; 709/250; 370/235; 370/392; 370/466; 370/467; 713/153; 713/160; 713/162

(58) Field of Classification Search .................. 709/250
See application file for complete search history.

(56) References Cited

U.S. PATENT DOCUMENTS

| 5,442,708 | A | 8/1995 | Adams, Jr. et al. |
| 6,072,875 | A | 6/2000 | Tsudik |
| 7,023,996 | B2 | 4/2006 | Stephenson et al. |

| 2004/0117488 | A1* | 6/2004 | McNamee ................ 709/229 |
| 2006/0184789 | A1* | 8/2006 | Karasawa et al. ........... 713/160 |

OTHER PUBLICATIONS

Fu, et al., "NSIS: A New Extensible IP Signaling Protocol Suite", IEEE Communications Magazine, Internet Technology Series, Oct. 2005. Found at http://www.tmg.informatik.uni-goettingen.de/publications/1216/NSIS_CommMag05.pdf.

Schulzrinne, et al., "Next Steps in Signaling" Internet-Draft, GIST: General Internet Signaling Transport Columbia University, Aug. 31, 2006. Found at: http://www.ietf.org/internet-drafts/draft-ietf-nsis-ntlp-11.txt.

* cited by examiner

*Primary Examiner*—Thu Nguyen
*Assistant Examiner*—Neeraj Utreja
(74) *Attorney, Agent, or Firm*—Fox Rothschild, LLP; Robert J. Sacco

(57) ABSTRACT

A system (706, 714) is provided for a network signaling bypass around a cryptographic device (1008, 1108). The system is comprised of an interface (1002, 1102) configured to receive a plurality of packets and communicate the packets that are of a non-GIST type to a non-GIST bypass circuit (1004-1, 1004-2) and the packets that are of a GIST type to a GIST bypass circuit (1006-1, 1006-2). The non-GIST bypass circuit is configured to selectively bypass a first packet around the cryptographic device to an output device (1010, 1110, 1012, 1112) if the first packet comprises signaling protocol data for a network (710) over which the first packet is communicated. The GIST bypass circuit is configured to selectively bypass a second packet around the cryptographic device to the output device if the second packet comprises GIST signaling transport protocol data for the network over which the second packet is communicated.

16 Claims, 14 Drawing Sheets

HYBRID INTERNET PROTOCOL ENCRYPTOR/DECRYPTOR BYPASS DEVICE

BACKGROUND OF THE INVENTION

1. Statement of the Technical Field

The invention concerns packet-switched network signaling, and more particularly, a method for selectively bypassing signaling protocols around a cryptographic device.

2. Description of the Related Art

There has been a growing demand for improved communication applications provided by packet-switching communications networks. As a result, signaling has been employed to improve the abilities of the packet-switching communications networks. Such signaling includes the transmission of packets including signaling protocol data and/or user data (for example, voice data and/or video data) between nodes and/or terminals of the packet-switching networks. To enable the transmission of the packets between a set of nodes or terminals, the packets are typically encapsulated between one or more layer headers and trailers (for example, a data link layer header, a data link layer trailer a network layer header, a network layer trailer, a transport: layer header, a transport layer trailer, an application layer header, and an application layer trailer). The encapsulation framework depends on the network's protocol model (such as an open system interconnection model or Department of Defense protocol model).

Various users require encryption of user data prior to transmission over a network to preserve the data's secrecy. In this regard, networks often include a cryptographic device at each end node or terminal to perform encryption/decryption of data prior to or after its transmission over the network. Such a network configuration suffers from certain drawbacks. For example, a packet including signaling data is encrypted at an end node/terminal prior to transmission over the network. Consequently, signaled network services fail because intermediate network nodes/terminals are unable to recognize the encrypted signalling information.

In view of the forgoing, the industry recognized a need to modify the network architecture. In this regard, a device is placed on an end user side of the cryptographic device for a network signaling bypass around the cryptographic device. As a result, signaled network services do not fail because the intermediate network nodes/terminals are able to recognize the signaling information.

Despite the vast array of signaled network services provided by packet-switching networks, there is a growing demand for even more signaled network services, see *NSIS: A New Extensible IP Signaling Protocol Suite*, IEEE Communications Magazine, October 2005, written by Xiaoroing Fu, Aftila Bader, Cornelia Kappler, and Hannes Tschofenig. For example, various users desire quality of service guarantee (QoS), configuring firewall hole services, and network address translator (NAT) services. See Id. In this regard, the Internet Engineering Task Force (IETF) developed a resource reservation protocol (RSVP) for supporting QoS flows (i.e., requests for specific QoS from the network, delivery of QoS requests to all nodes or terminals along a transmission path, and establishing and maintaining state to provide a requested service). See Id. However, RSVP has only been applied to resource reservations for integrated services (IntServ) and differentiated services (DiffServ). See Id. As such, a Next Step in Signaling (NSIS) Group was formed to standardize a signaling framework to support a more general array of signaled network services. See Id.

The NSIS signaling transport protocol framework includes two layers. These layers include a NSIS Transport Level Protocol (NTLP) and a NSIS Signaling Layer Protocol (NSLP). See Id. The NSLP layer is higher in the NSIS protocol stack as compared to the NTLP layer. In this regard, it should be understood that the term "NSLP layer" is generally understood to be a generic term for an NSIS protocol component that supports a specific signaling application. In this regard, an NSLP is not a generic layer but is designed to operate in conjunction with functionality associated with a particular signaling application. From the foregoing, it will be understood that the NSLP layer interacts with the NTLP layer below and a signaling application above that it is designed to support. The NSLP can define message formats (protocol data units), message sequences, and so on which are associated with a particular signaling application.

Each signaling application requires the assignment of one or more NSLP Identifiers (NSLPIDs), Different NSLPIDs may foe used to distinguish different classes of signaling applications, for example to handle different aggregation levels or different processing subsets). The NSLPID is typically a 16 bit integer and must be associated with a unique RAO value.

The NTLP is below the NSLP layer in the NSIS protocol stack. The NTLP layer interacts with the transport layer below it. It is also designed to interact with various different NSLPs that can exist above it in the NSIS protocol stack. An important function of the NTLP is transporting of signaling messages from the NSLP layer to an adjacent NSIS node. In this regard, the NTLP is generally understood to include two sub-layers. The sub-layers include: the General Internet Signaling Transport Protocol (GIST) layer and the existing network transport layers such as TCP and UDP. From the foregoing if will be understood that GIST is a primary part of the NTLP protocol stack. The NTLP layer determines whether received message from the next, lower layer should be forwarded to the NSLP layer, it can also determine whether the message should be forwarded to the next GIST node.

Each signaling application requires the assignment of one or more NTLP Identifiers (NTLPIDs). The value of an NTLPID depends on an underlying transport protocol (for example, UDP, TCP, and SCTP). For example, if the underlying transport protocol is a UDP, then the NTLPID is a well known port number assigned by the internet Assigned Numbers Authority (IANA) at the request of the NSIS Group, if the underlying transport protocol is a TCP or a SCTP, then the NTLPID is contained in a header option field and is a value typically assigned by the IANA at another business entity's request.

This recent development of the NTLP and NSLP has presented new problems in signaling. For example, if QoS services, configuring firewall hole services, and NAT services are to be provided by packet-switching networks, NTLP packets need to be recognized by intermediate network nodes/terminals. As such, there is a need to once again modify the packet-switching networks configuration. Specifically, a bypass component residing before a cryptographic device needs to be upgraded to accommodate the new signaling protocols so that intermediate nodes in the packet switching networks can receive unencrypted signaling protocol packets that are needed for proper operation.

SUMMARY OF THE INVENTION

The invention concerns a system for a network signaling bypass around a cryptographic device. The system is comprised of an interface configured to receive one or more packets that are of a non-GIST type and one or more packets that are of a GIST type. The interface is also configured to communicate packets that are of a non-GIST type to a non-GIST bypass circuit. The interface is further configured to communicate packets that are of a GIST type to a GIST bypass circuit. The non-GIST bypass circuit is configured to selectively bypass a first packet around the cryptographic device to an output device if the first packet comprises signaling protocol data for a network over which the first packet is communicated. Similarly, the GIST bypass circuit is configured to selectively bypass a second packet around the cryptographic device to the output device if the second packet comprises GIST signaling transport protocol data for the network over which the second packet is communicated.

According to an aspect of the invention, the non-GIST bypass circuit is configured to de-encapsulate a data link layer protocol header, a data link layer protocol trailer, a network layer protocol header, a network layer protocol trailer, a transport layer protocol header, and a transport layer protocol trailer of the first packet. The non-GIST bypass circuit is also configured to parse a protocol identifier from a transport layer protocol header. The non-GIST bypass circuit is also configured to determine whether the protocol identifier is a signaling type protocol identifier, the first packet is re-encapsulated. If the protocol identifier is the signaling type protocol identifier, the non GIST bypass circuit bypasses the first packet around the cryptographic device. If the protocol identifier is not the signaling type protocol identifier, the non-GIST bypass circuit communicates the first packet to the cryptographic device.

According to another aspect of the invention, the GIST bypass circuit is configured to de-encapsulate a data link layer protocol header, a data link layer protocol trailer, a network layer protocol header, a network layer protocol trailer, a transport layer protocol header, and a transport layer protocol trailer of the second packet. The GIST bypass circuit is also configured to parse a GIST signaling transport protocol identifier from a transport layer protocol header. The GIST bypass circuit is further configured to determine whether the GIST signaling transport protocol identifier is a NTLP or NSIS signaling transport protocol identifier. After determining whether a GIST signaling transport protocol identifier is a NTLP or NSIS signaling transport protocol identifier, the second packet is re-encapsulated. If the GIST signaling transport protocol identifier is a NTLP or NSIS signaling transport protocol identifier, the GIST bypass circuit bypasses the second packet around the cryptographic device. If the GIST signaling transport protocol identifier is not a NTLP or NSIS signaling transport protocol identifier, the GIST bypass circuit communicates the second packet to the cryptographic device.

A method for bypassing network signaling packets around a cryptographic device is also provided. The method involves receiving one or more packets that are of a GIST type and one or more packets that are of a non-GIST type. The method also involves selectively bypassing a packet of the non-GIST type around the cryptographic device to an output device if the packet includes signaling data for a network over which the packet is communicated. The method further involves selectively bypassing a packet of the GIST type around the cryptographic device to the output device if the packet includes GIST signaling transport protocol data for a network over which the packet is communicated.

According to an aspect of the invention, the method includes de-encapsulating a data link layer protocol header, a data link layer protocol trailer, a network layer protocol header, a network layer protocol trailer, a transport layer protocol header, and a transport layer protocol trailer of a packet that is of the non-GIST type. The method also includes parsing a protocol identifier from a transport layer protocol header. The method further includes determining whether the protocol identifier is a signaling type protocol identifier. After determining whether the protocol identifier is a signaling type protocol identifier, the packet is re-encapsulated. If the protocol identifier is a signaling type protocol identifier, the packet is bypassed around the cryptographic device. If the protocol identifier is not a signaling type protocol identifier, the packet is communicated to the cryptographic device.

According to another aspect of the invention, the method includes de-encapsulating a data link layer protocol header, a data link layer protocol trailer, a network layer protocol header, a network layer protocol trailer, a transport layer protocol header, and a transport layer protocol trailer of a packet that is of the GIST type. The method also includes parsing a GIST signaling transport protocol identifier from a transport layer protocol header. The method further includes determining whether the GIST signaling transport protocol identifier is a NTLP or NSIS signaling transport protocol identifier. After determining whether the GIST signaling transport protocol identifier is a NTLP or NSIS signaling transport protocol identifier, the packet is re-encapsulated, if the GIST signaling transport protocol identifier is a NTLP or NSIS signaling transport protocol identifier, the packet is bypassed around the cryptographic device. If the GIST signaling transport protocol identifier is not a NTLP or NSIS signaling transport protocol identifier, the packet is communicated to the cryptographic device.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
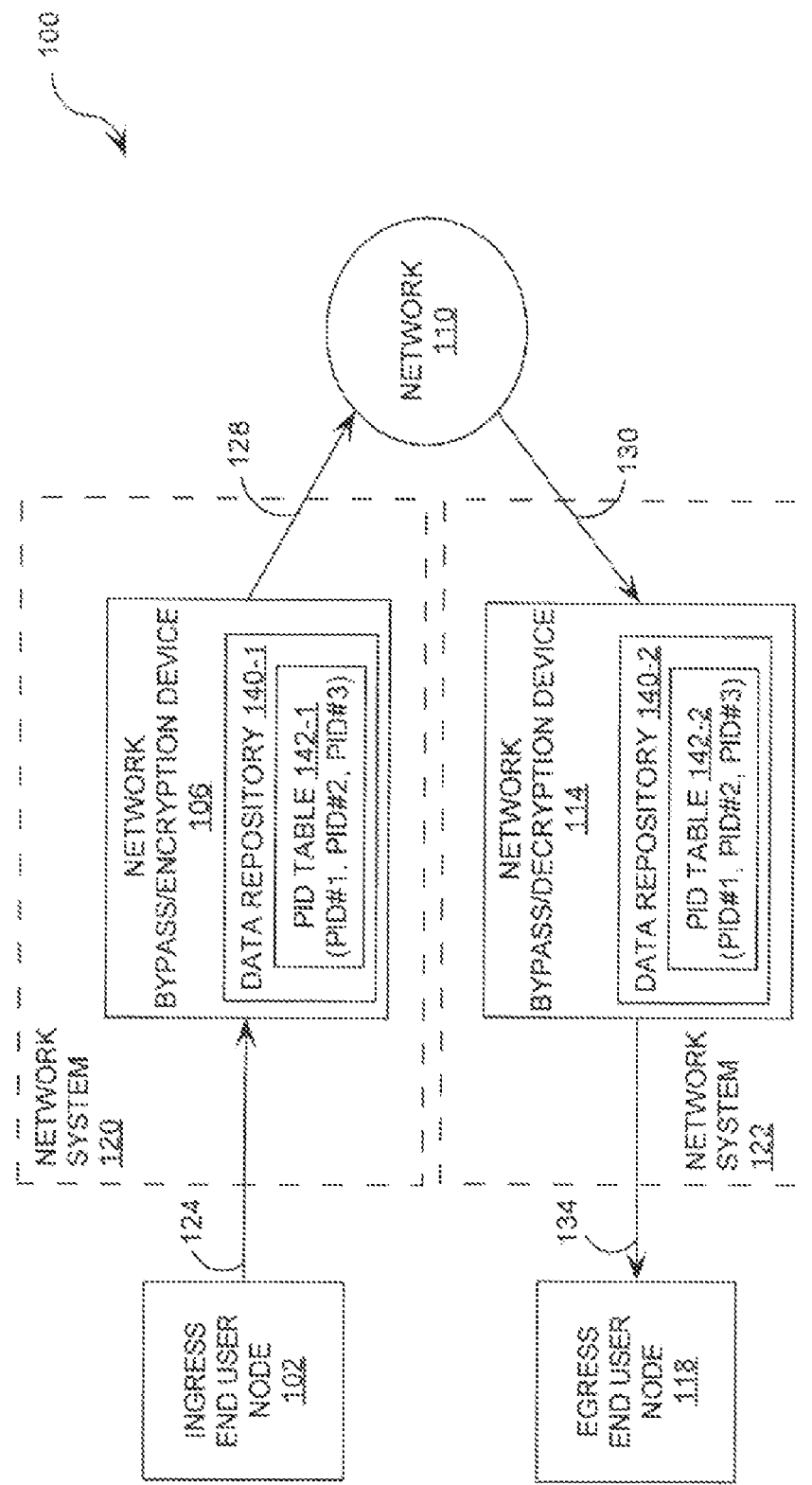
FIG. 1 is a block diagram of a conventional packet based communications system that is useful for understanding a conventional signaling bypass application.

FIG. 1 is a block diagram of a conventional packet based communications system 100. The communications system 100 is comprised of an ingress end user node (IEUN) 102, network systems 120, 122, a network 110, and an egress end user node (EEUN) 118. The IEUN 102 is a source of a plurality of packets including data packets and signaling packets. The IEUN 102 can be a source computer system, a routing device, a sensor, or any other device having a TCP/IP based packet interface. The IEUN 102 is electrically connected to the network system 120 via a data bus 124, In this regard, the IEUN 102 performs actions involving communication of packets to the network system 120.

The network, system 120 is comprised of a network bypass/encryption device 108 having a data repository 140-1. The data repository 140-1 provides a means for storing at least one of a data link layer protocol header, a data link layer protocol trailer, a network layer protocol header, a network layer protocol frailer, a transport layer protocol header, a transport layer protocol trailer, and/or a protocol identifier (PID). Each of the listed headers and trailers are described below (in relation to FIG. 3A). The data repository 140-1 is comprised of a protocol identifier (PID) table 142-1 including a list of bypass protocol identifiers (for example, PID #1, PID #2, and PID #3). As will be understood by a person skilled in the art, a value of a bypass protocol identifier can be equal to a well known port number or any other numerical value that has been assigned by the Internet Assigned Numbers Authority (IANA) to indicate that a packet is a signaling packet.

The network bypass/encryption device 108 performs actions involving a bypass method. The bypass method involves initializing a protocol index of the data repository 140-1. The bypass method also involves de-encapsulating a packet at a data link layer, a network layer, and a transport layer. Each of the listed layers will be described in below (in relation to FIG. 2). This de-encapsulation involves storing headers and trailers associated with each of the above listed layers in the data repository 140-1. The bypass method further involves parsing a protocol identifier (PID) from a transport layer protocol header (described below in relation to FIG. 3A and FIG. 3B), storing the PID in the data repository 140-1, querying the data repository 140-1 for a bypass PID, and determining whether the PID is equal to the bypass PID. This process is repeated for a plurality of bypass PIDs, which are stored in the data repository 140-1, until the PID parsed from the transport layer protocol header has been compared to each of the bypass PIDs stored in the data repository 140-1. If the PID parsed from the transport layer protocol header matches one of the bypass PIDs, the packet is determined to be a signaling packet and is bypassed around an encryption device. As such, the packet is communicated to the network 110 without encryption. The bypass method will be described in greater detail below (in relation to FIG. 4 and FIG. 6).

The network bypass/encryption device 108 also performs actions involving the encryption of non-bypassed packets. As shown in FIG. 1, the network bypass/encryption device 106 is electrically or optically connected to the network 110 via a network link 128. As such, the network bypass/encryption device 108 performs actions involving the communication of packets to the network 110. The network bypass/encryption device 106 will be described in further detail below (in relation to FIG. 4).

The network 110 is an internet protocol based (IP-based) packet-switching network, such as a wide area network (WAN) or a local area network (LAN). The network 110 is electrically or optically connected to the network system 122 via a network link 130.

The network system 122 is comprised of a network bypass/decryption device 114 having a data repository 140-2. The data repository 140-2 provides a means for storage of at least one of a data link layer protocol header, a data link layer protocol frailer, a network layer protocol header, a network layer protocol trailer, a transport layer protocol header, a transport layer protocol trailer, and/or at least one PID. Each of the listed headers and trailers are described below (in relation to FIG. 3A). The data repository 140-2 is comprised of a PID table 142-2 including a list of bypass PIDs (for example, PID #1, PID #2, and PID #3).

The network bypass/decryption device 114 performs actions involving a bypass method. The bypass method involves the initialization of a protocol index of the data repository 140-2. The bypass method also Involves de-encapsulating a packet at the data link layer, the network layer, and the transport layer. This de-encapsulation involves removing headers and trailers associated with each of the above listed layers from a packet and storing the same in the data repository 140-2. The bypass method further involves parsing a PID from a transport layer protocol header (described below in relation to FIG. 3A and FIG. 3B), storing the PID in the data repository 140-2, querying the data repository 140-2 for a bypass PID, and determining whether the PID is equal to the bypass PID. This comparison step is repeated until the PID parsed from the transport layer protocol header has been compared to each bypass PID stored in the data repository 140-2 or until it matches one of the bypass PIDs (as shown in FIG. 6). If the PID parsed from the transport layer protocol header matches one of the bypass PIDs, then the packet is determined to be a signaling packet which does not require decryption. Accordingly, the packet is not decrypted. Instead, the packet is reassembled and passed on to the EEUN 118. The bypass method will be described in greater detail below (in relation to FIG. 5 and FIG. 6).

The network bypass/decryption device 114 also performs actions involving decryption of non-bypassed packets. As shown in FIG. 1, the network bypass/decryption device 114 is electrically connected to the EEUN 118 via a data bus 134. As such, the network bypass/decryption device 114 performs actions involving the communication of packets to the EEUN 118. The network bypass/decryption device 114 will be described in further detail below (in relation to FIG. 5).

The EEUN 118 is the destination of a plurality of packets in a signaling network. The EEUN 118 can be a destination computer system or a routing device.

Figure 2:
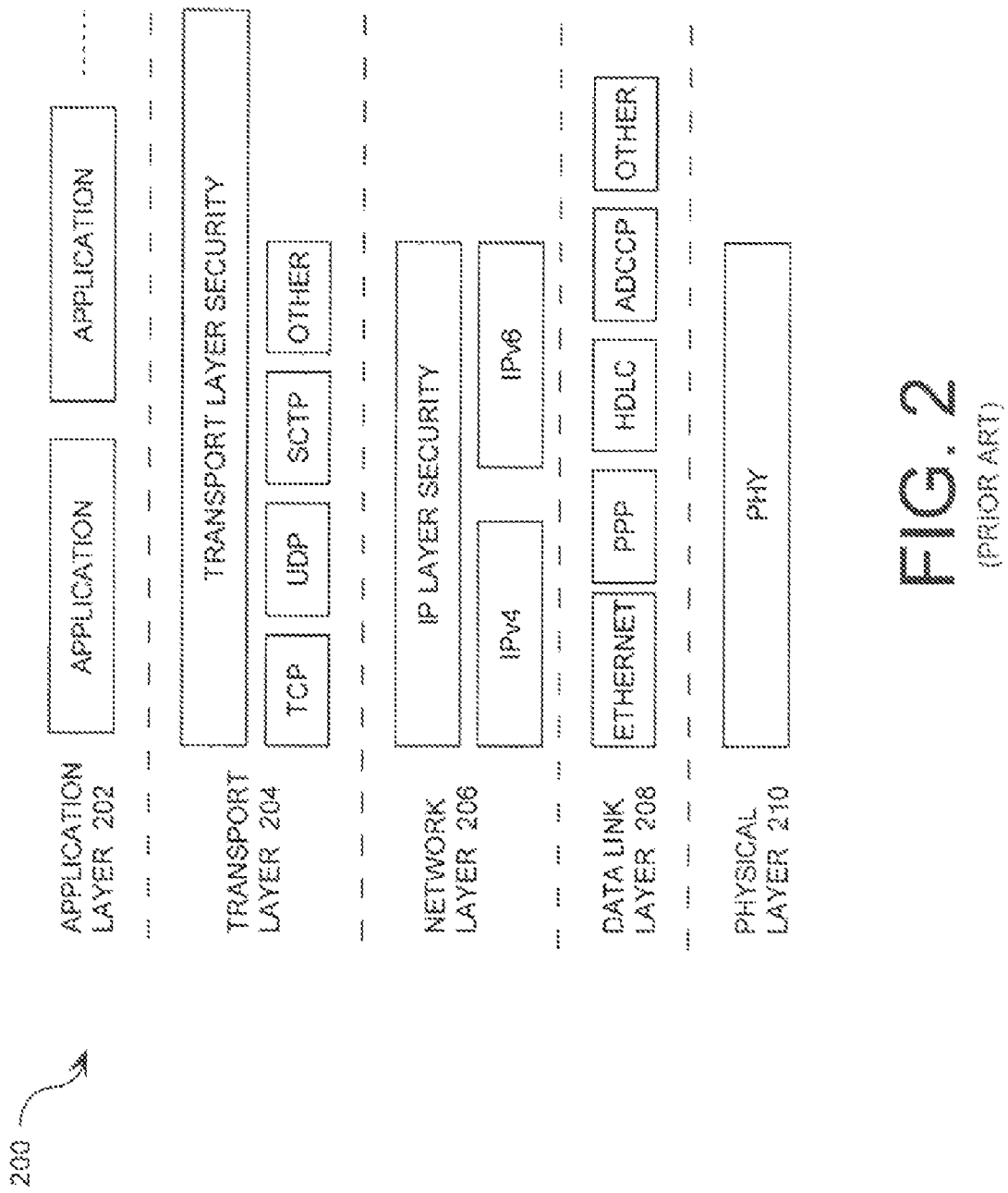
FIG. 2 is a protocol stack for the conventional packet based communications system of FIG. 1 that is useful for understanding a conventional signaling bypass application.

Referring now to FIG. 2, there is provided a protocol stack 200 for the conventional packet based communications system 100 of FIG. 1. The protocol stack 200 is well known to persons skilled in the art. Thus, the protocol stack 200 will not be described in great detail herein. However, a brief discussion is provided below to assist a reader in understanding a conventional network signaling bypass application (described below in relation to FIG. 4 through FIG. 6).

Referring again to FIG. 2, the protocol stack 200 is comprised of a physical layer 210, a data link layer 20S, a network layer 206, a transport layer 204, and an application layer 202. The physical layer 210 is comprised of hardware for sending and receiving data through a network 110. The data link layer 208 provides transmission protocols for transferring data between network 110 nodes. Such transmission protocols can include an Ethernet protocol, a point-to-point protocol (PPP), a high level data link control (HDLC) protocol, an advanced data communications control protocol (ADCCP), and other such protocols.

The network layer 208 provides protocols for transferring data from one node to another node, in this regard, the transmission protocols include routing protocols and forwarding protocols. Such transmission protocols include internet protocols, such as version four (4) of the internet protocol (IPv4), version six (6) of the internet protocol (IPv6), and internet security protocols (IP Layer Security).

The transport layer 204 provides transport protocols for transmission of data between end systems. Such transport protocols include a transmission control protocol (TCP), a user datagram protocol (UDP), and a stream control transmission protocol (SCTP). The transport layer 204 also provides transport layer security protocols. The application layer 202 provides signaling protocols for end-user applications, such as authentication applications, data syntax applications, quality of service applications, and end-user application and management protocols.

Figures 3A, 3B:
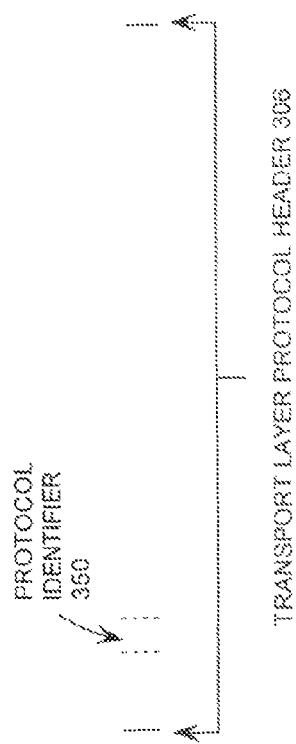
FIG. 3A is a block diagram of a packet that is useful for understanding a conventional signaling bypass application.
FIG. 3B is a schematic illustration of a transport layer protocol header that is useful for understanding a conventional signaling bypass application.

Referring now to FIG. 3A, there is provided a block diagram of a packet 300 that is useful for understanding a conventional network signaling bypass application (described below in relation to FIG. 4 through FIG. 6). As shown in FIG. 3A, the packet 300 is comprised of a data link layer protocol header 302, a data link layer protocol trailer 318, a network layer protocol header 304, a network layer protocol trailer 316, a transport layer protocol header 306, and a transport layer protocol trailer 314. The packet 300 is also comprised of an application layer protocol header 308, a data 310, and an application layer protocol trailer 312. Each of the listed components of the packet 300 are well known to persons skilled in the art and are well defined in open industry standards of the Internet Engineering Task Force (IEFT), Thus, such components will not be described in great detail herein.

However, it should be appreciated that the data 310 can be signaling protocol data, user data (such as voice data or video data), or management data. If should also be appreciated that the application layer protocol header 308, the data 310, and the application layer protocol trailer 312 are encapsulated between the transport layer protocol header 306 and the transport layer protocol trailer 314. Similarly, the transport layer protocol header 306 and the transport layer protocol trailer 314 are encapsulated between the network layer protocol header 304 and the network layer protocol trailer 316. Likewise, the network layer protocol header 304 and the network layer protocol trailer 316 are encapsulated between the data link layer protocol header 302 and the data link layer protocol frailer 318.

Referring now to FIG. 3B, there is provided a schematic illustration of a transport layer protocol header 306 that is useful for understanding a conventional network signaling bypass application (described below in relation to FIG. 4 through FIG. 6). As shown in FIG. 3B, the transport layer protocol header 306 is comprised of a protocol identifier (PID) 350. The PID 350 is a unique identification assigned to a specific protocol.

Figure 4:
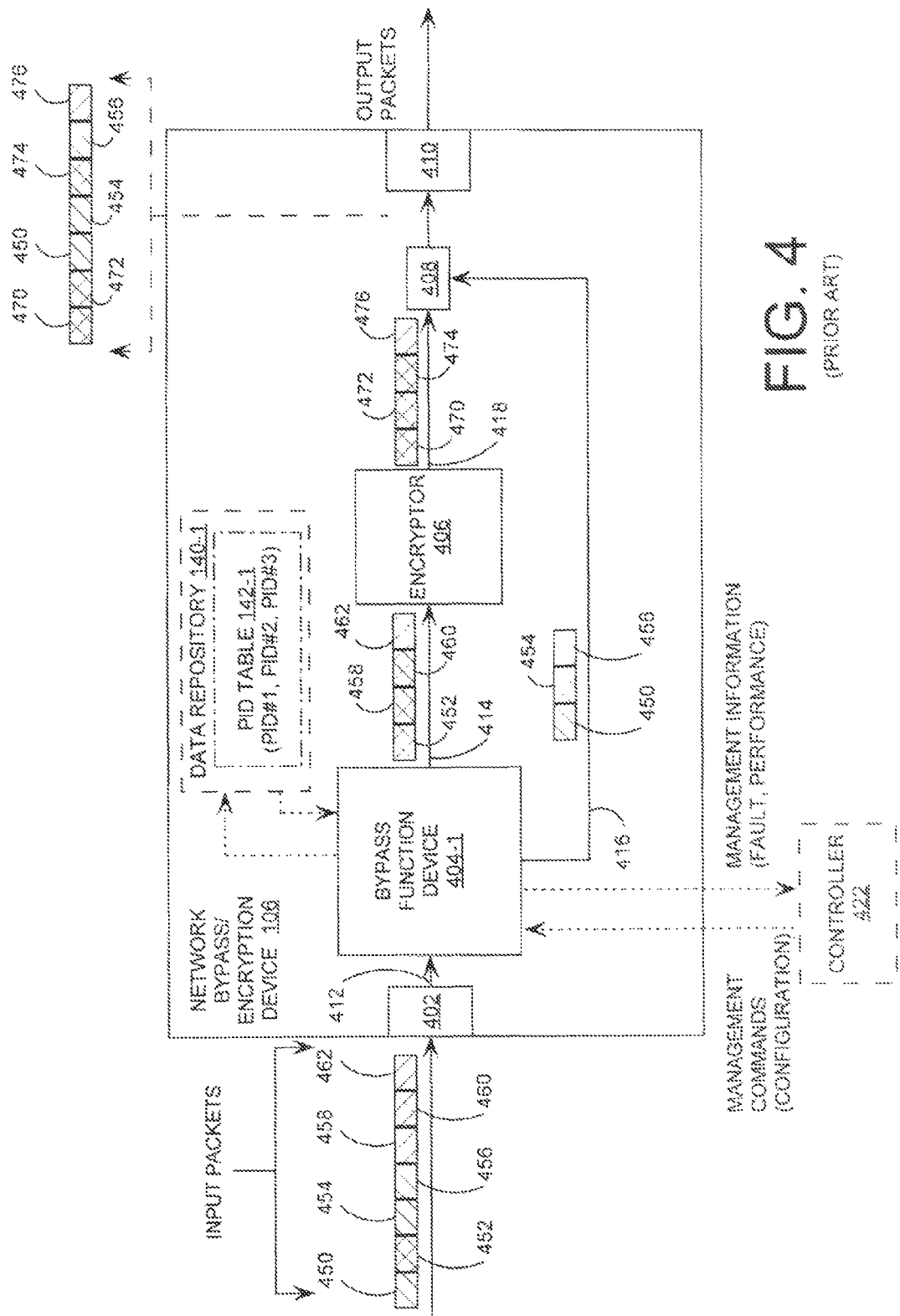
FIG. 4 is a block diagram of a network bypass/encryption device of FIG. 1.

Referring now to FIG. 4, there is provided a more detailed block diagram of the network bypass/encryption device 106 shown in FIG. 1. The network bypass/encryption device 108 is further comprised of interfaces 402, 410, a bypass function device 404-1, an encryptor 406, and a packet forwarding device 408. The interface 402 provides a means for communication of input packets 450, 452, 454, 456, 458, 460, 462 from an external device (such as an IEUN 102) to the network bypass/encryption device 106. The interface 402 is electrically connected to the bypass function device 404-1 via a data bus 412. In this regard, the interface 402 communicates packets 450, 452, 454, 456, 458, 460, 462 to the bypass function device 404-1.

The bypass function device 404-1 is configured to receive packets 450, 452, 454, 456, 458, 460, 462. The bypass function device 404-1 is also configured to perform a bypass method. The bypass method includes initializing a protocol index of a data repository 140-1, querying the data repository 140-1 for at least one bypass PID, parsing a PID 350 from a transport layer protocol header 306, determining whether the PID 350 is equal to the at least one bypass PID, and reconstructing the packet 450, 452, 454, 456, 458, 460, 462. The bypass method also includes forwarding a packet including user data 452, 458, 460 to the encryptor 406, forwarding a packet including a non-bypass PID 462 to the encryptor 406, and forwarding a packet 450, 454, 456, including a bypass PID to the packet forwarding device 408. The bypass method is described in greater detail below (in relation to FIG. 8).

The encryptor 406 is electrically connected to the bypass function device 404-1 via a data bus 414. In this regard, the encryptor 406 performs actions involving the receipt of packets 452, 458, 460, 462 and the encryption of packets 452, 458, 460, 462. It should be appreciated that the encryptor 406 includes hardware and software for encrypting the packets in accordance with a particular network encryption application. For example, the encryptor 406 can encrypt the data portion of a packet 452, 458, 460, 462. Alternatively, the encryptor 406 can encrypt an entire packet 452, 458, 460, 462. The encryptor 406 can then encapsulate the encrypted packet with at least one new header and trailer, in this regard, it should be appreciated that the encrypted packets 470, 472, 474, and 476 shown in FIG. 4 correspond to the unencrypted packets 452, 458, 460, 462, respectively, in accord with the network bypass/encryption device 106 architecture shown in FIG. 4, the encryptor 406 also includes hardware and software for communicating the encrypted packets 470, 472, 474, 476 to the packet forwarding device 408 via a data bus 418.

The packet forwarding device 408 is comprised of a circuit configured to arrange packets 470, 472, 450, 454, 474, 456, 476 for a transmission to the interface 410. The interface 410 provides a means for a serial transmission of the packets 470, 472, 450, 454, 474, 456, 476 to the network 110 (described above in relation to FIG. 1).

It should be appreciated that a controller 422 can be provided for configurable management control of the bypass function device 404-1. Such an architecture provides a system for reconfiguration of the bypass function device 404-1 without adjusting or replacing its hardware components and/or software components.

Figure 5:
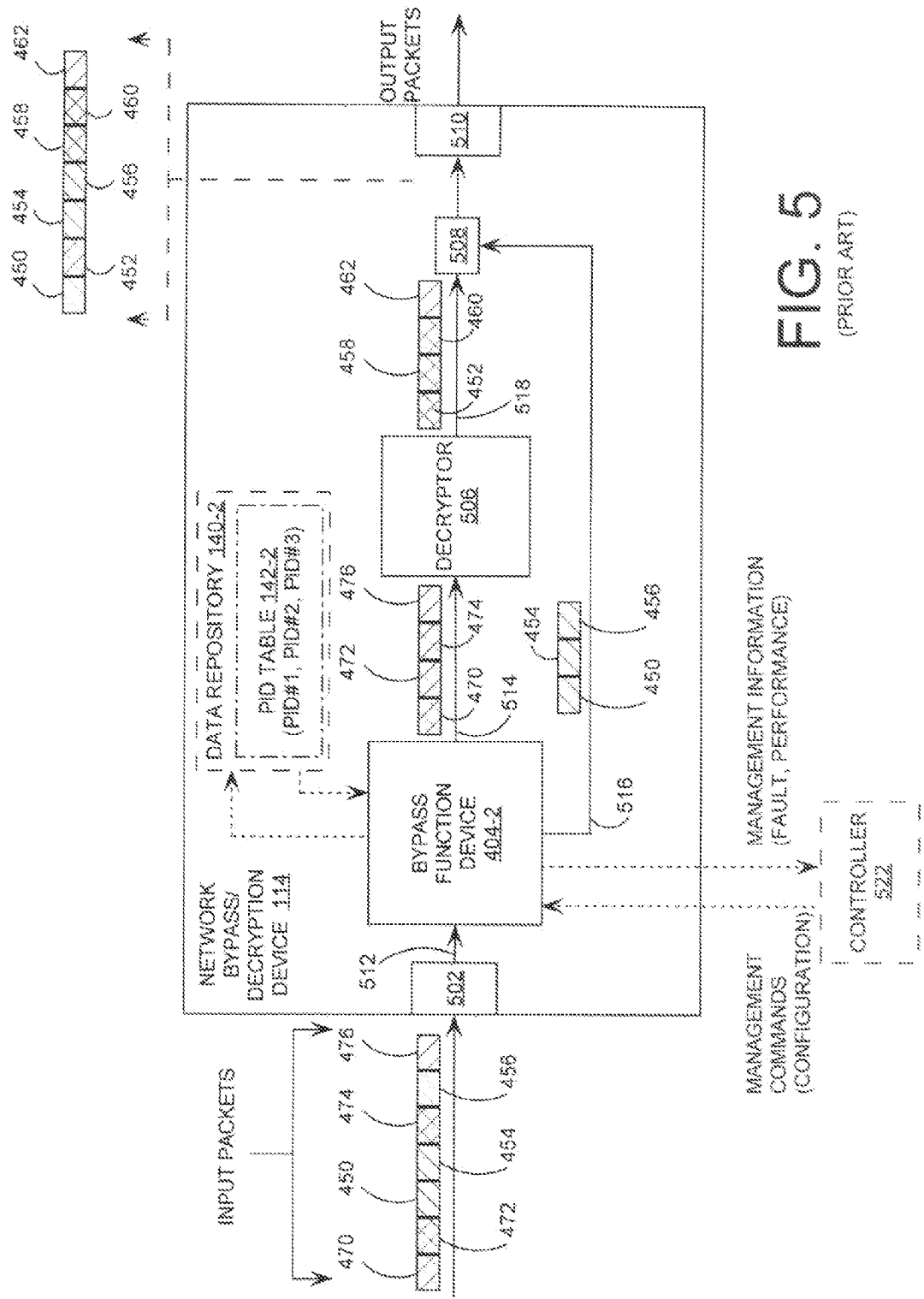
FIG. 5 is a block diagram of a network bypass/decryption device of FIG. 1.
Figure 6:
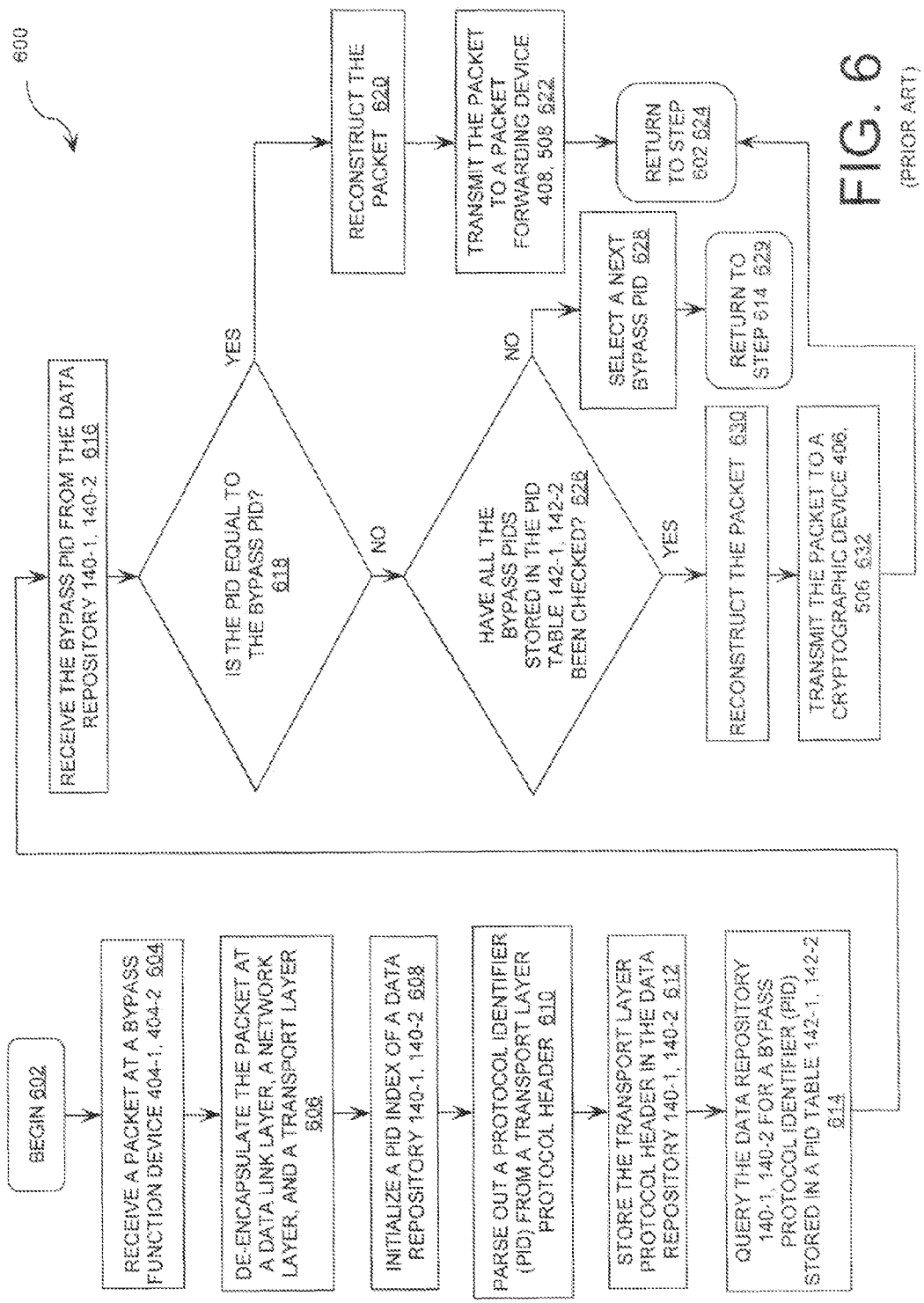
FIG. 6 is a flow chart of a bypass method performed by a conventional bypass function device shown in FIG. 4 and FIG. 5.

Referring now to FIG. 5, there is provided a more detailed block diagram of a network bypass/decryption device 114 shown in FIG. 1. The network bypass/decryption device 114 is further comprised of interfaces 502, 510, a bypass function device 404-2, a decryptor 506, and a packet forwarding device 508. The interface 502 provides a means for communication of input packets 470, 472, 450, 454, 474, 456, 476 from a network 110 to the network bypass/decryption device 114. The interface 502 is electrically connected to the bypass function device 404-2 via a data bus 512. In this regard, the interface 502 communicates packets 470, 472, 450, 454, 474, 456, 476 to the bypass function device 404-2.

The bypass function device 404-2 is configured to receive packets 470, 472, 450, 454, 474, 456, 476. The bypass function device 404-2 is also configured to perform a bypass method. The bypass method includes initializing a protocol index of a data repository 140-2, querying the data repository 140-2 for at least one bypass PID, parsing a PID 350 from a transport layer protocol header 306, determining whether the PID 350 is equal to the at least one bypass PID, and reconstructing the packet 470, 472, 450, 454, 474, 456, 476. The bypass method also includes forwarding a packet 470, 472, 474 including user data to the decryptor 506, forwarding a packet 476 including a non-bypass PID to the decryptor 506, and forwarding a packet 450, 454, 456 including a bypass PID to the packet forwarding device 508. The bypass method is described in greater detail below (in relation to FIG. 8).

The decryptor 506 is electrically connected to the bypass function device 404-2 via a data bus 514. In this regard, the decryptor 506 performs actions involving the receipt of packets 470, 472, 474, 476 and the decryption of packets 470, 472, 474, 476. It should be appreciated that the decryptor 506 includes hardware and software for decrypting the packets in accordance with a particular network decryption application. For example, the decryptor 506 can decrypt the data portion of a packet 470, 472, 474, 476. Alternatively, the decryptor 506 can de-encapsulate the encrypted packet of at least one header and at least one trailer. The decryptor 506 can then decrypt the remaining components of the packet 470, 472, 474, 476. In this regard, it should be appreciated that the decrypted packets 452, 458, 460, and 462 shown in FIG. 5 correspond to the encrypted packets 470, 472, 474, 476, respectively, in accord with the network bypass/decryption device 114 architecture shown in FIG. 5, the decryptor 506 includes hardware and software for communicating decrypted packets 452, 458, 460, 462 to the packet forwarding device 508 via a data bus 518.

The packet forwarding device 508 is comprised of a circuit configured to arrange packets 450, 452, 454, 456, 458, 460, 462 for transmission to the interface 510. The interface 510 provided a means for a serial transmission of the packets 450, 452, 454, 456, 458, 460, 462 to the EEUN 118 (described above in relation to FIG. 1).

It should be appreciated that a controller 522 can be provided for configurable management control of the bypass function device 404-2. Such an architecture provides a system for reconfiguration of the bypass function device 404-2 without adjusting or replacing its hardware components and/or software components.

Figure 8:
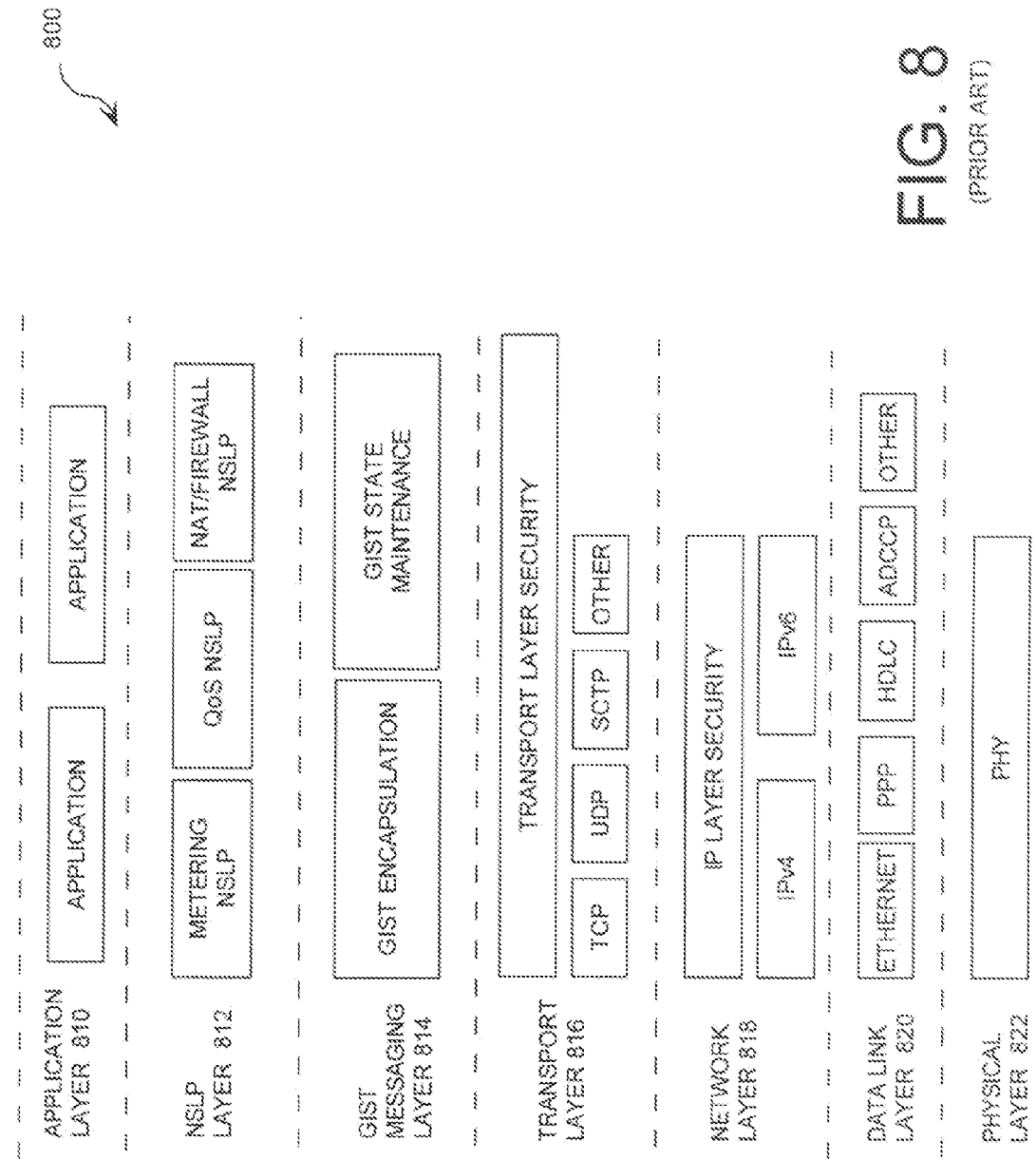
FIG. 8 is a NSIS protocol stack for the packet based communications system of FIG. 7 that is useful for understanding the invention.

Referring now to FIG. 8, there is provided a flow chart of a conventional bypass method 600 performed by a bypass function devices 404-1, 404-2 shown in FIG. 4 and FIG. 5. The bypass method 600 begins at step 602 and continues with step 604. In step 604, a packet is received at a bypass function device 404-1, 404-2. In step 606, the bypass function device 404-1, 404-2 de-encapsulates the packet at a data link layer 208, a network layer 206, and a transport layer 204. This step involves removing a data link layer protocol header, a data link layer protocol trailer, a network layer protocol header, a network layer protocol trailer, a transport layer protocol header, and a transport layer protocol trailer from the packet. This step also involves storing the data link layer protocol header, the data link layer protocol trailer, the network layer protocol header, the network layer protocol trailer, the transport layer protocol header, and the transport layer protocol trailer in a data repository 140-1, 140-2. After de-encapsulation of the packet, control passes to step 608 where a PID index of the data repository 140-1, 140-2 is initialized. Subsequently, step 610 is performed where a PID 350 is parsed from a transport layer protocol header 306. The transport layer protocol header 306 is stored in the data repository 140-1, 140-2 for use in a later packet reconstruction process. In step 614, the bypass function device 404-1, 404-2 queries the data repository 140-1, 140-2 for a bypass PID stored in a PID table 142-1, 142-2. In step 818, the bypass function device 404-1, 404-2 receives the bypass PID.

Subsequently, the method 600 continues with a decision stop 618. If the PID 350 is equal to the bypass PID (618:YES), control passes to step 620. In step 620, the packet is reconstructed. This step involves re-encapsulating a saved end application protocol data unit within the transport layer protocol header 306, the transport layer protocol trailer 314, the network layer protocol header 304, the network layer protocol frailer 316, the data link layer protocol header 302, and the data link layer protocol trailer 318 successively in this order. After the packet is reconstructed, the bypass function device 404-1, 404-2 transmits the reconstructed packet to a packet forwarding device 408, 508. In step 624, control returns to step 602.

If the PID 350 is not equal to the bypass PID (618:NO), control passes to a decision step 626. If all the bypass PIDs stored in the PID table 142-1, 142-2 have not been checked (626:NO), the method 600 continues with step 628 where a next bypass PID is selected. Subsequently, control passes to step 629 where method 600 returns to step 614.

If all the bypass PIDs stored in the PID table 142-1, 142-2 have been checked (626:YES), the method 600 continues with step 630. In step 630, the packet is reconstructed. This step involves re-encapsulating a saved end application protocol data unit within the transport layer protocol header 306, the transport layer protocol trailer 314, the network layer protocol header 304, the network layer protocol trailer 316, the data link layer protocol header 302, and the data link layer protocol trailer 318 successively in this order. After the packet is reconstructed, the bypass function device 404-1, 404-2 transmits the packet to a cryptographic device 408, 506. After step 632, control passes to step 624 where the method 600 returns to step 602.

It should be appreciated that the conventional bypass method suffers from certain drawbacks. For example, a number of bypass signaling protocol IDs are checked by a bypass function device 404-1, 404-2. As such, a computationally intensive bypass function is performed by a bypass function device 404-1, 404-2. This results in a relatively slow processing time for performing the bypass function. It should also be noted that the conventional bypass method requires one or more bypass PID repositories (for example, the data repositories 140-1, 140-2 shown in FIG. 1). These bypass PID repositories need to be created and managed. It should further be appreciated that the conventional bypass method is becoming more computationally burdensome and obsolete as new signaling protocols that are being introduced for a network signaling.

A Communications System Supporting a NSIS Signaling Transport Protocol Framework The invention will now be described hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can fake the form as an entirely hardware embodiment, an entirely software embodiment, or a hardware/software embodiment.

Embodiments of the present invention will now be described with respect to FIG. 7 through FIG. 14. Some embodiments of the present invention provide methods, systems, and apparatus relating to a bypass function. The bypass function involves transmitting a network signaling along a path that bypasses a cryptographic device (such as an encryptor and/or a decryptor). Accordingly, an embodiment including the listed function is discussed further below.

Figure 7:
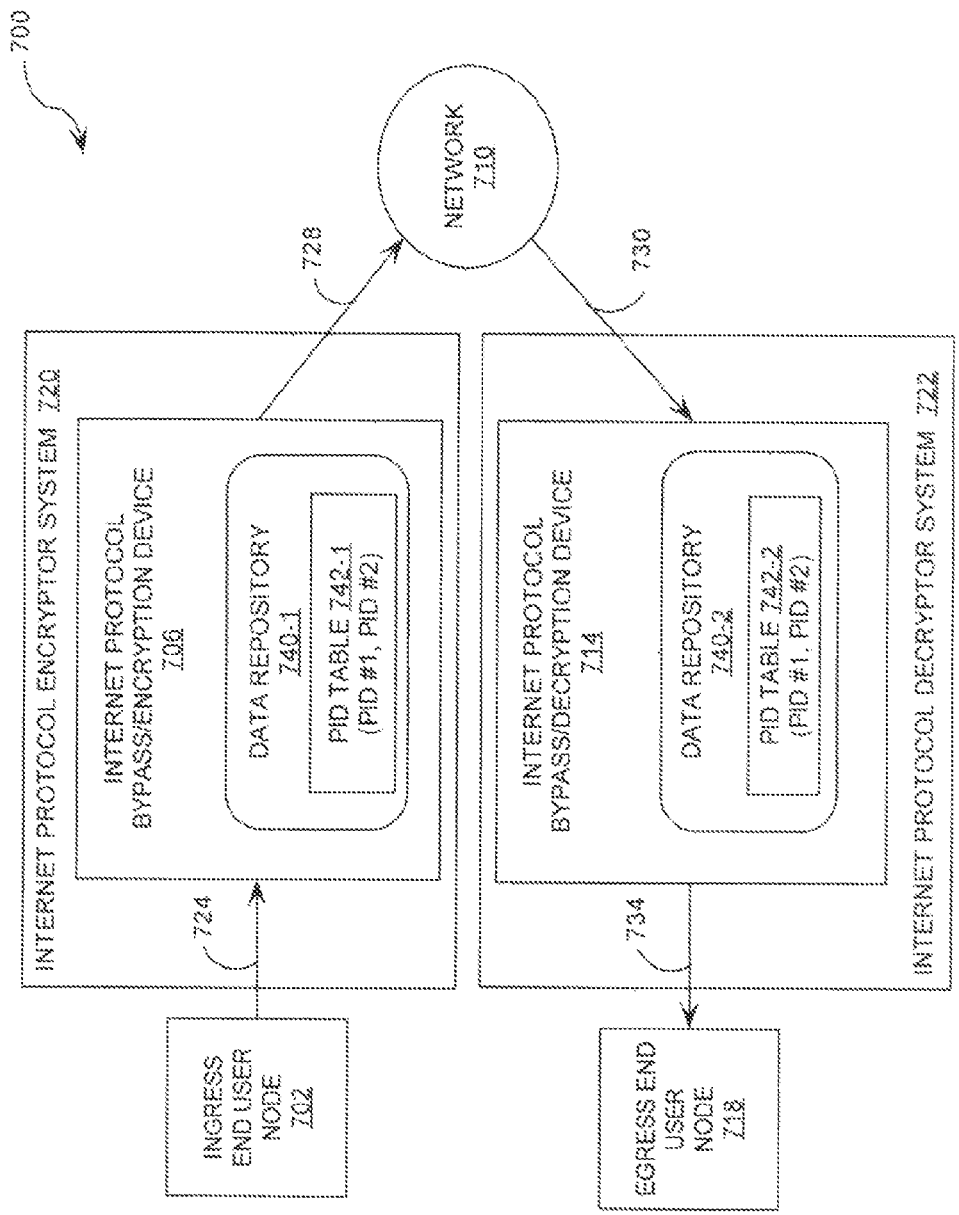
FIG. 7 is a block diagram of a packet based communications system supporting a NSIS signaling transport protocol framework that is useful for understanding the invention.

FIG. 7 is a block diagram of a packet based communications system 700 that is useful for understanding the invention. It should be understood that the communications system 700 supports a NSIS signaling transport protocol framework. The NSIS signaling transport protocol framework is well known to persons skilled in the art. Thus, the NSIS signaling transport protocol framework will not be described in great detail herein. However, a NSIS protocol stack is briefly described below (in relation to FIG. 8) to assist a reader in understanding the present invention.

Referring again to FIG. 7, the communications system 700 is comprised of an ingress end user node (IEUN) 702, an internet protocol encryptor system (IPES) 720, an internet protocol decryptor system (IPDS) 722, a network 710, and an egress end user node (EEUN) 718. The IEUN 702 can be of any network element type known in the art, such as an end user device, a server, a firewall device, a computer system, or a routing device. The IEUN 702 is electrically connected to the IPES 720 via a data bus 724. In this regard, the IEUN 702 performs actions involving the communication of packets to the IPES 720.

It should be understood that the packets are of a non-GIST type and a GIST type. Both of the non-GIST type packets and the GIST type packets include signaling packets and data packets. A non-GIST type packet 300 is described above in relation to FIG. 3A. In this regard, the description above is sufficient for understanding a non-GIST typo packet 300. A GIST type packet is described below in relation to FIG. 9A.

As shown in FIG. 7, the IPES 720 is comprised of an internet protocol bypass/encryption device 706 having a data repository 740-1. The data repository 740-1 may be a RAM, a disk drive, a CD-ROM, and/or any other form of bulk storage, in this regard, the data repository 740-1 provides a means for storing at least one of a data link layer protocol header, a data link layer protocol trailer, a network layer protocol header, a network layer protocol trailer, a transport layer protocol header, a transport layer protocol trailer, and/or a protocol identifier (PID). Each listed header and trailer will be described below in relation to FIG. 9A. The data repository 740-1 also provides a means for storing a generic internet signaling transport (GIST) PID (described below in relation to FIG. 9B).

As shown in FIG. 1, the data repository 740-1 is comprised of a protocol identifier (PID) table 742-1. The PID table 742-1 includes a list of bypass protocol identifiers. For example, the list can include protocol identifiers PID #1 and PID #2. The bypass protocol identifiers can be used to identify signaling packets of a non-GIST type to be bypassed around a cryptographic device. The signaling protocol identifiers are hereinafter referred to as bypass protocol identifiers (PIDs). As will be understood by a person skilled in the art, a value of a bypass PIP can be equal to a well known port number or any other numerical value that has been assigned by the internet Assigned Numbers Authority (IANA) to indicate that a packet is a signaling packet.

The bypass/encryption device 708 performs actions involving a non-GIST bypass method. The non-GIST bypass method involves transmitting a packet including specific non-GIST signaling protocol data along a path that bypasses an encryptor (described below in relation to FIG. 10). The bypass/encryption device 706 also performs actions involving a GIST bypass method. The GIST bypass method involves transmitting a signaling protocol packet whose transport mechanism is the GIST protocol of the NSIS signaling transport protocol framework along a path that bypasses an encryptor. The non-GIST and GIST bypass methods will be described in greater detail below (in relation to FIG. 10 and FIG. 12 through FIG. 14).

The bypass/encryption device 706 also performs actions involving the encryption of non-bypassed packets. As shown in FIG. 7, the bypass/encryption device 706 is electrically or optically connected to the network 710 via a network link 728. As such, the bypass/encryption device 706 performs actions involving the communication of packets to the network 710. The bypass/encryption device 706 will be described in greater detail below (in relation to FIG. 10).

The network 710 is an internet protocol based (IP-based) packet-switching network, such as a wide area network (WAN) or a local area network (LAN). The network 710 is electrically or optically connected to the IPDS 722 via a network link 730.

The IPDS 722 is comprised of an internet protocol bypass/decryption device 714 having a data repository 740-2. The data repository 740-2 may be a RAM, a disk drive, a CD-ROM, and/or any other form of bulk storage. In this regard, the data repository 740-2 provides a means for storing at least one of a data link layer protocol header, a data link layer protocol frailer, a network layer protocol header, a network layer protocol trailer, a transport layer protocol header, a transport layer protocol trailer, and/or at least one PID. Each of these listed headers and trailers will be described below in relation to FIG. 9A. The data repository 740-2 also provides a means for storing a GIST PID (described below in relation to FIG. 9B).

As shown in FIG. 7, the data repository 740-2 is comprised of a protocol identifier (PID) table 742-2. The PID table 742-2 includes a table populated with one or more signaling protocol identifiers (for example, PID #1 and PID #2). The protocol identifiers can be used to identify signaling packets of a non-GIST type to be bypassed around a cryptographic device. The signaling protocol identifiers are herein after referred to as bypass protocol identifiers (PIDs). As will be understood by a person skilled in the art, a value of a bypass PID can be equal to a well known pod number or any other numerical value that has been assigned by the Internet Assigned Numbers Authority (IANA) to indicate that a packet is a signaling packet.

The bypass/decryption device 714 performs actions involving a non-GIST bypass method. The non-GIST bypass method involves transmitting a packet including specific non-GIST signaling protocol data along a path that bypasses a decryptor (described below in relation to FIG. 11). The bypass/decryption device 714 also performs actions involving a GIST bypass method. The GIST bypass method involves transmitting a signaling protocol packet whose transport mechanism is the GIST protocol of the NSIS signaling transport protocol framework along a path that bypasses the decryptor. The non-GIST and GIST bypass methods will be described in greater detail below (in relation to FIG. 11 and FIG. 12 through FIG. 14).

The bypass/decryption device 714 also performs actions involving the decryption of non-bypassed packets. As shown in FIG. 7, the bypass/decryption device 714 is electrically connected to the EEUN 718 via a data bus 734. As such, the bypass/decryption device 714 performs actions involving the communication of packets to the EEUN 718. The bypass/decryption device 714 will be described in greater detail below (in relation to FIG. 11).

The EEUN 718 is the destination of a plurality of packets in a signaling network. The EEUN 718 can be of any network element type known in the art, such as a destination computer system, a server, a firewall device, or a routing device.

A person skilled in the art will appreciate that communications system 700 architecture is one embodiment of a communications system architecture. However, the invention is not limited in this regard and any other communications system architecture can be used without limitation.

FIG. 8 is a NSIS protocol stack 800 for a communications system 700 of FIG. 7 that is useful for understanding the invention. As shown in FIG. 8, the protocol stack 800 is comprised of a physical layer 822, a data link layer 820, a network layer 818, a transport layer 816, a generic internet signaling transport (GIST) messaging layer 814, a NSIS signaling layer protocol (NSLP) layer 812, and an application layer 810. The physical layer 822 is comprised of hardware for sending and receiving data through a network 710 (shown in FIG. 7).

The data link layer 820 provides transmission protocols for transferring data between network 710 nodes. Such transmission protocols include an Ethernet protocol, a point-to-point protocol (PPP), a high level data link control (HDLC) protocol, an advanced data communications control protocol (AD-CCP), and other such protocols.

The network layer 818 provides protocol for transferring data from one node to another node. In this regard, the transmission protocols include routing protocols and forwarding protocols. Such transmission protocols include internet protocols, such as a version tour (4) of the internet protocol (IPv4), a version six (6) of the internet protocol (IPv6), and internet security protocols (IP Layer Security).

The transport layer 816 provides transport protocols for transmission of data between end systems. Such transport protocols include a transmission control protocol (TCP), a user datagram protocol (UDP), a stream control transmission protocol (SCTP), and other such protocols. The transport layer 816 also provides transport: layer security protocols.

The GIST messaging layer 814 provides signaling transport protocols for the transmission of signaling protocols between NSIS nodes 702, 718 and to intermediate nodes contained in a network 710 (shown in FIG. 7). The GIST messaging layer 814 also provides signaling transport protocols for the enablement of control information (such as, error messaging and/or route modification messaging) exchange between NSIS nodes 702, 718. As shown in FIG. 8, the GIST messaging layer 814 provides protocols for GIST encapsulation and GIST state maintenance.

The NSLP layer 812 provides signaling protocols for message formatting, message sequencing, quality of service applications, resource reservation applications, metering entity applications, network address translation (NAT) applications, and firewall applications. The application layer 810 provides end-user applications, such as authentication applications, data syntax applications, and quality of service applications.

The foregoing description is useful for understanding a protocol stack for a communications system supporting a NSIS signaling transport protocol framework. In this regard, a more detailed description of the NSIS protocol stack can be found in "GIST: General Internet Signaling Transport, Aug. 31, 2006," written by H. Schulzrinne and R. Hancock. The entire disclosure of this publication is incorporated herein by reference. In this regard, it should be understood that this document is a work in progress. As such, any successive works associated with this publication should also be referenced for understanding a protocol stack for a communications system supporting NSIS signaling transport protocol framework.

Figures 9A, 9B:
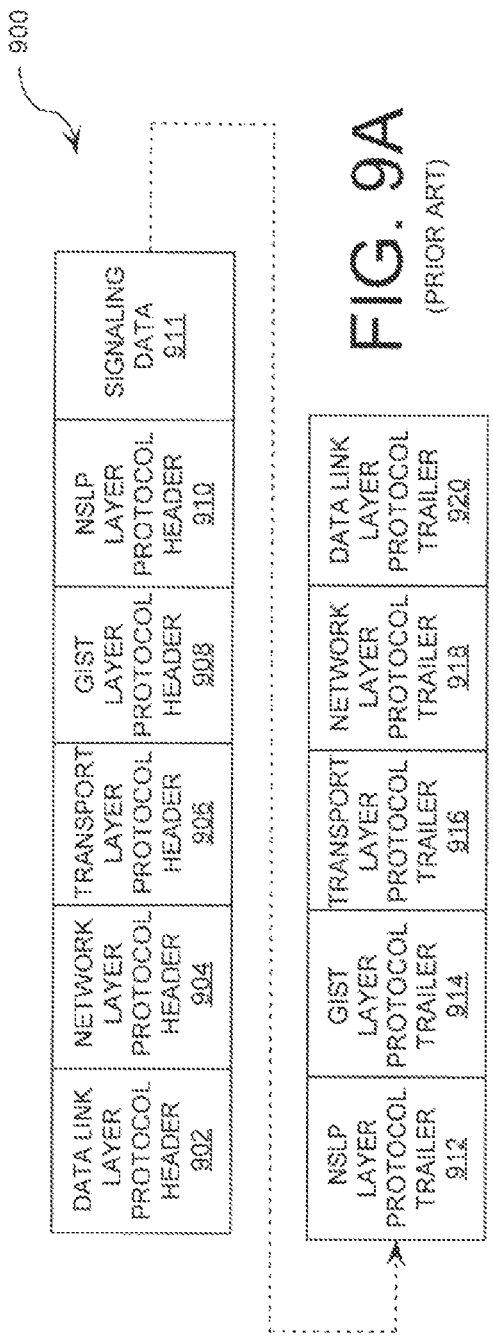
FIG. 9A is a block diagram of a signaling packet that is useful for understanding the invention.
FIG. 9B is a schematic illustration of a transport layer protocol header that is useful for understanding the invention.

Referring now to FIG. 9A, there is provided a block diagram of a GIST type packet 900 that is useful for understanding the invention. As shown in FIG. 9A, the packet 900 is comprised of a data link layer protocol header 902, a data link layer protocol trailer 920, a network layer protocol header 904, a network layer protocol trailer 918, a transport layer protocol header 906, and a transport layer protocol trailer 916. The packet 900 is also comprised of a GIST messaging layer protocol header 908, a GIST messaging layer protocol trailer 914, a NSLP layer protocol header 910, a signaling data 911, and a NSLP layer protocol frailer 912. Each of the listed components 902, 904, 906, 908, 910, 911, 912, 914, 916, 918, 920 of the packet 900 are well known to persons skilled in the art. Thus, such components will not be described in great detail herein.

However, it should be appreciated that the NSLP layer protocol header 910 and the NSLP layer protocol trailer 912 are encapsulated between the GIST messaging layer protocol header 908 and the GIST messaging layer protocol trailer 914. Likewise, the GIST messaging layer protocol header 908 and the GIST messaging layer protocol trailer 914 are encapsulated between the transport layer protocol header 906 and the transport layer protocol trailer 916. The transport layer protocol header 906 and the transport layer protocol frailer 916 are encapsulated between the network layer protocol header 904 and the network layer protocol trailer 918. The network layer protocol header 904 and the network layer protocol trailer 918 are encapsulated between the data link layer protocol header 902 and the data link layer protocol trailer 920.

A person skilled in the art will appreciate that the GIST type packet 900 architecture is one embodiment of a GIST type packet architecture. However, the invention is not limited in this regard and any other packet architecture can be used without limitation provided that it includes a transport layer protocol header and trailer.

Referring now to FIG. 9B, there is provided a schematic illustration of a transport layer protocol header 906 that is useful for understanding the invention. As shown in FIG. 9B, the transport layer protocol header 906 is comprised of a GIST signaling transport protocol identifier 960. The GIST signaling transport protocol identifier 960 is a unique identification assigned to a specific GIST protocol.

As will be understood by a person skilled in the art, a value of a GIST signaling transport protocol identifier 960 can be equal to a well known port number or any other numerical value that has been assigned by the Internet Assigned Numbers Authority (IANA) to indicate that a packet is a signaling packet. For example, if an underlying transport protocol is a UDP, then the GIST signaling transport protocol identifier 960 would reside in a UDP header and have a value equal to a well known port number assigned by the IANA at the request of a NSIS Group, if the underlying transport protocol is a TCP or SCTP, then the GIST signaling transport protocol identifier 960 would reside in a header option field and have a value equal to a value assigned by the IANA at a relevant organization's request.

Figure 10:
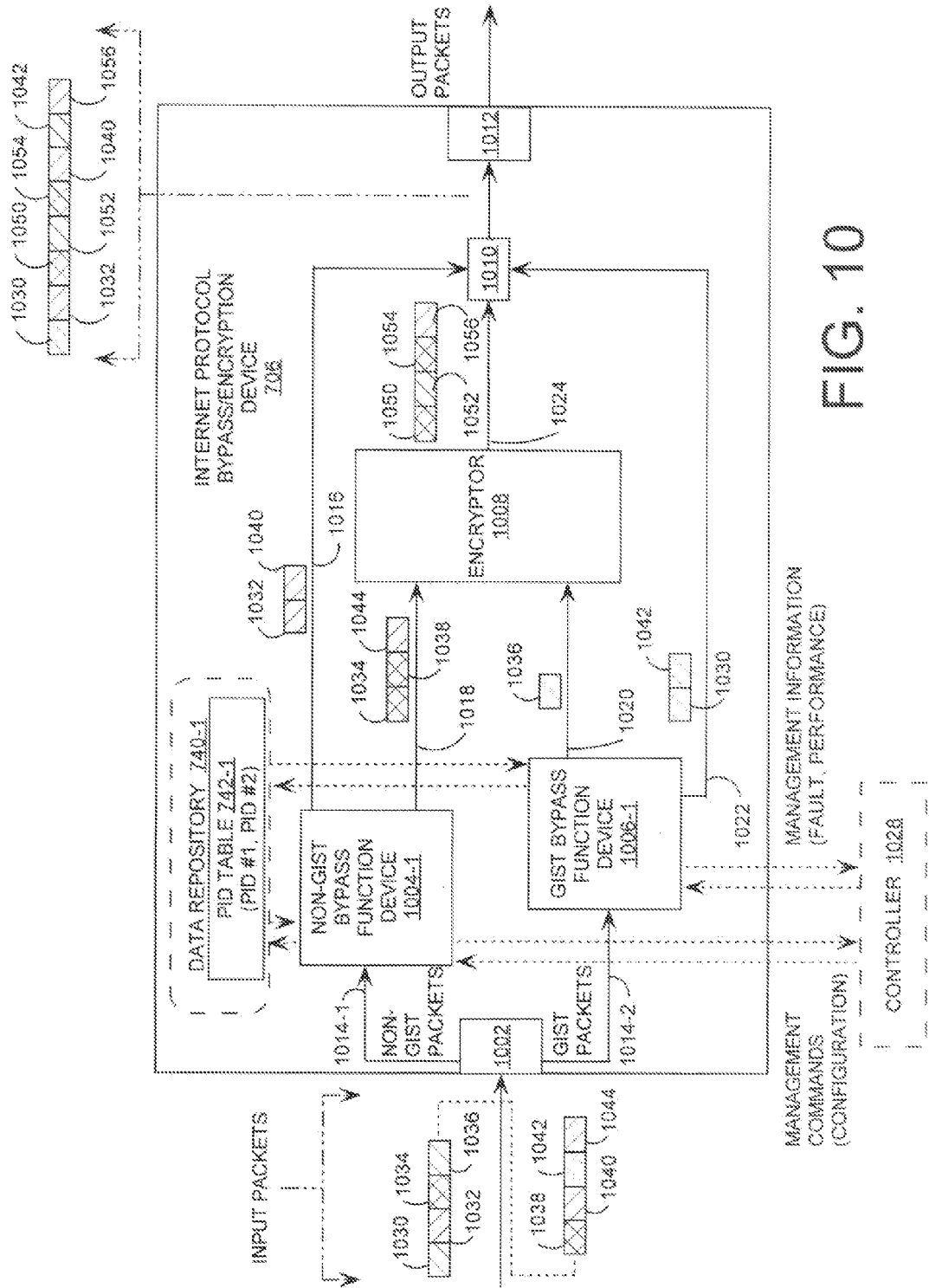
FIG. 10 is a block diagram of an internet protocol bypass/encryption device shown in FIG. 7 that is useful for understanding the invention.

Referring now to FIG. 10, there is provided a more detailed block diagram of an Internet protocol bypass/encryption device 706 shown in FIG. 7. The bypass/encryption device 706 is comprised of interfaces 1002, 1012, a non-GIST bypass function device 1004-1, a GIST bypass function device 1006-1, an encryptor 1008, and a packet forwarding device 1010. The interface 1002 provides a means for a communication of input packets 1030, 1032, 1034, 1036, 1038, 1040, 1042, 1044 from an external device (such as an IEUN 702) to the bypass/encryption device 706.

As shown in FIG. 10, the interface 1002 is electrically connected to the non-GIST bypass function device 1004-1 via a data bus 1014-1. In this regard, the interface 1002 includes hardware and software configured to communicate packets 1032, 103-4, 1038, 1040, 1044 to the non-GIST bypass function device 1004-1. It should be understood that the packets 1032, 1034, 1038, 1040, 1044 are non-GIST type packets 300 comprised of non-GIST signaling protocol data and/or user data. It should also be appreciated that any method known in the art for determining if a packet is a non-GIST type packet 300 can be employed without limitation.

The interface 1002 is also electrically connected to the GIST bypass function devices 1006-1 via a data bus 1014-2. In this regard, the interface 1002 includes hardware and software configured to communicate packets 1030, 1036, 1042 to the GIST bypass function device 1006-1. It should be understood that the packets 1030, 1036, 1042 are GIST type packets 900 comprised of GIST signaling protocol data and/or user data. It should also be appreciated that any method known in the art for determining if a packet is a GIST type packet 900 can be employed without limitation.

However, the invention is not limited in this regard. For example, the interface 1002 can alternatively perform actions for communicating all packets 1030, 1032, 1034, 1036, 1038, 1040, 1042, 1044 to the GIST bypass function device 1006-1 and the non-GIST bypass function device 1004-1. In such a scenario, the GIST bypass function device 1006-1 can perform actions to determine whether a packet is a GIST type packet 900. If a packet is a GIST type packet 900, then the GIST bypass function device 1006-1 can perform actions to determine whether the GIST type packet should be bypassed around the encryptor 1008. If the packet is not a GIST typo packet 900, then the GIST bypass function device 1006-1 can perform actions to cease processing the packet, discard the packet, and continue to a next packet. The GIST bypass function device 1006-1 can then determine if the next packet is a GIST type packet 900. This process can be repeated for all packets 1030, 1032, 1034, 1036, 1038, 1040, 1042, 1044 received at the GIST bypass function device 1006-1.

Similarly, the non-GIST bypass function device 1004-1 can perform actions to determine whether a packet is a non-GIST type packet 300. If a packet is a non-GIST type packet 300, then the non-GIST bypass function device 1004-1 can perform actions to determine whether the non-GIST type packet 300 should be bypassed around the encryptor 1008. If the packet is not a non-GIST type packet 300, then the non-GIST bypass function device 1004-1 can perform actions to cease processing the packet, discard the packet, and continue to a next packet. The non-GIST bypass function device 1004-1 can then determine if the next packet is a non-GIST type packet 300. This process can be repeated for all packets 1030, 1032, 1034, 1036, 1038, 1040, 1042, 1044 received at the non-GIST bypass function device 1004-1.

Referring again to FIG. 10, the non-GIST bypass function device 1004-1 is configured to receive a packet 1032, 1034, 1038, 1040, 1044 from the interface 1002. The non-GIST bypass function device 1004-1 is also configured to perform a bypass method. The bypass method includes initializing a protocol index of a data repository 740-1, querying the data repository 740-1 for at least one bypass PID, and receiving the at least one bypass PID from the data repository 740-1. The bypass method also includes de-encapsulating the packet 1032, 1034, 1038, 1040, 1044 at a data link layer 820, a network layer 818, and a transport layer 816. As used herein, the term de-encapsulating means that header information is removed from the packet to expose an application layer header 308 (described above in relation to FIG. 3A and FIG. 3B). The bypass method further includes parsing a PID 350 (described above in relation to FIG. 3B) from a transport layer protocol header 306. The method also includes determining whether the PID 350 is equal to the at least one bypass PID and reconstructing the packet 1032, 1034, 1038, 1040, 1044. After the packet is reconstructed, it is either transmitted to the encryptor 1008 or the packet forwarding device 1010. For example, a packet including user data 1034, 1038 is forwarded to the encryptor 1008 via a data bus 1018. A packet including a non-bypass PID 1044 is also forwarded to the encryptor 1008 via the data bus 1018. A packet including a bypass PID 1032, 1040 is forwarded to the packet forwarding device 1010 via a data bus 1018. The bypass method is described in greater detail below (in relation to FIG. 12 and FIG. 13).

It should be appreciated that a controller 1028 can be advantageously provided for configurable management control of the non-GIST bypass function device 1004-1. Specifically, the controller 1028 can enable or disable the bypass function performed by the non-GIST bypass function device 1004-1 thereby providing flexibility in the configuration of the bypass/encryption device 706 and its functions. In this way, a smooth, controlled migration path to enable the bypass function is provided. Also, flexibility in other operational aspects such as handling of security alarms and troubleshooting is enhanced. Such an architecture provides a system for reconfiguration of the non-GIST bypass function device 1004-1 without adjusting or replacing its hardware and/or software components.

The GIST bypass function device 1006-1 is configured to receive a packet 1030, 1036, 1042 from the interface 1002. The GIST bypass function device 1006-1 is also configured to perform a bypass method. The bypass method includes de-encapsulating a packet 1030, 1038, 1042 at a data link layer 820, a network layer 818, and a transport layer 816. As used herein, the term de-encapsulating means that header information is removed from the packet to expose a GIST messaging layer-header 908. The bypass method also includes parsing a GIST signaling transport protocol identifier 960 from a transport layer protocol header 906. The bypass method further involves determining whether the GIST signaling transport protocol identifier 960 is a NTLP or a NSIS signaling transport protocol identifier. It should be appreciated that the GIST signaling transport protocol identifier 960 can be identified by comparing it to a GIST PID value that is known to indicate that the packet is a signaling packet. For example, the GIST PID value is presently a value assigned by the internet Assigned Number Authority (IANA) which is well known to identify a signaling packet. In such a scenario, the GIST signaling transport protocol identifier 960 is determined to be a NTLP or a NSIS signaling transport protocol identifier if it matches (i.e., is equal to) the well known value assigned by the IANA. After a determination is made, the packet 1030, 1036, 1042 is reconstructed. If the GIST signaling transport protocol identifier 960 is determined to be a NTLP or a NSIS signaling transport protocol identifier, then the packet 1030, 1042 is transmitted to the packet forwarding device 1010 via a data bus 1022. If the GIST signaling transport protocol identifier 960 is determined not to be a NTLP or a NSIS signaling transport protocol identifier, then the packet 1036 is transmitted to the encryptor 1008 via a data bus 1020. The bypass method is described in greater detail below (in relation to FIG. 12 and FIG. 14).

It should be appreciated that a controller 1028 can be advantageously provided for configurable management control of the GIST bypass function device 1006-1, Specifically, the controller 1028 can enable or disable the bypass function performed by the GIST bypass function device 1006-1 thereby providing flexibility in the configuration of the bypass/encryption device 706 and its functions, in this way, a smooth, controlled migration path to enable the bypass function is provided. Also, flexibility in other operational aspects such as handling of security alarms and troubleshooting is enhanced. Such an architecture provides a system for reconfiguration of the GIST bypass function device 1006-1 without adjusting or replacing its hardware and/or software components.

The encryptor 1008 is electrically connected to the non-GIST bypass function device 1004-1 via a data bus 1018. The encryptor 1008 is also electrically connected to the GIST bypass function device 1006-1 via a data bus 1020. In this regard, the encryptor 1008 performs actions involving the receipt of packets 1034, 1036, 1038, 1044 and the encryption of packets 1034, 1036, 1038, 1044, ft should be appreciated that the encryptor 1008 includes hardware and software configured for encrypting the packets in accordance with a particular network encryption application. For example, the encryptor 1008 can encrypt the data portion of a packet 1034, 1036, 1038, 1044. Alternatively, the encryptor 1008 can encrypt an entire packet 1034, 1036, 1038, 1044. The encryptor can then encapsulate the encrypted packet with at least one new header and frailer. In this regard, it should be appreciated that the encrypted packets 1050, 1052, 1054, 1056 shown in FIG. 10 correspond to the unencrypted packets 1034, 1036, 1038, 1044, respectively. In accord with the bypass/encryption device 706 architecture of FIG. 10, the encryptor 1008 also includes hardware and software configured to communicate the encrypted packets 1050, 1052, 1054, 1056 to the packet forwarding device 1010 via a data bus 1024.

The packet forwarding device 1010 is comprised of a circuit configured to arrange packets 1050, 1052, 1054, 1056, 1030, 1032, 1040, 1042 for transmission to the interface 1012. The interface 1012 provides a means for a transmission of packets 1030, 1032, 1050, 1052, 1054, 1040, 1042, 1056 to the interface 1012. The interface 1012 provides a means for a serial transmission of the packets 1030, 1032, 1050, 1052, 1054, 1040, 1042, 1056 to a network 710 (described above in relation to FIG. 7).

A person skilled in the art will appreciate that the bypass/encryption device 706 architecture is one embodiment of a bypass/encryption device. However, the invention is not limited in this regard and any other bypass/encryption device architecture can be used without limitation provided that it is designed to support a NSIS signaling transport protocol framework. In this regard, it should be understood that the bypass functions performed by the bypass/encryption device 706 are independent of the encryption method employed by the encryptor 1008. As such, the present invention can be used with any encryption method known in the art, such as an internet protocol security (IPSec) encryption method and a high assurance internet protocol encryption (HAIEP) method.

Figure 11:
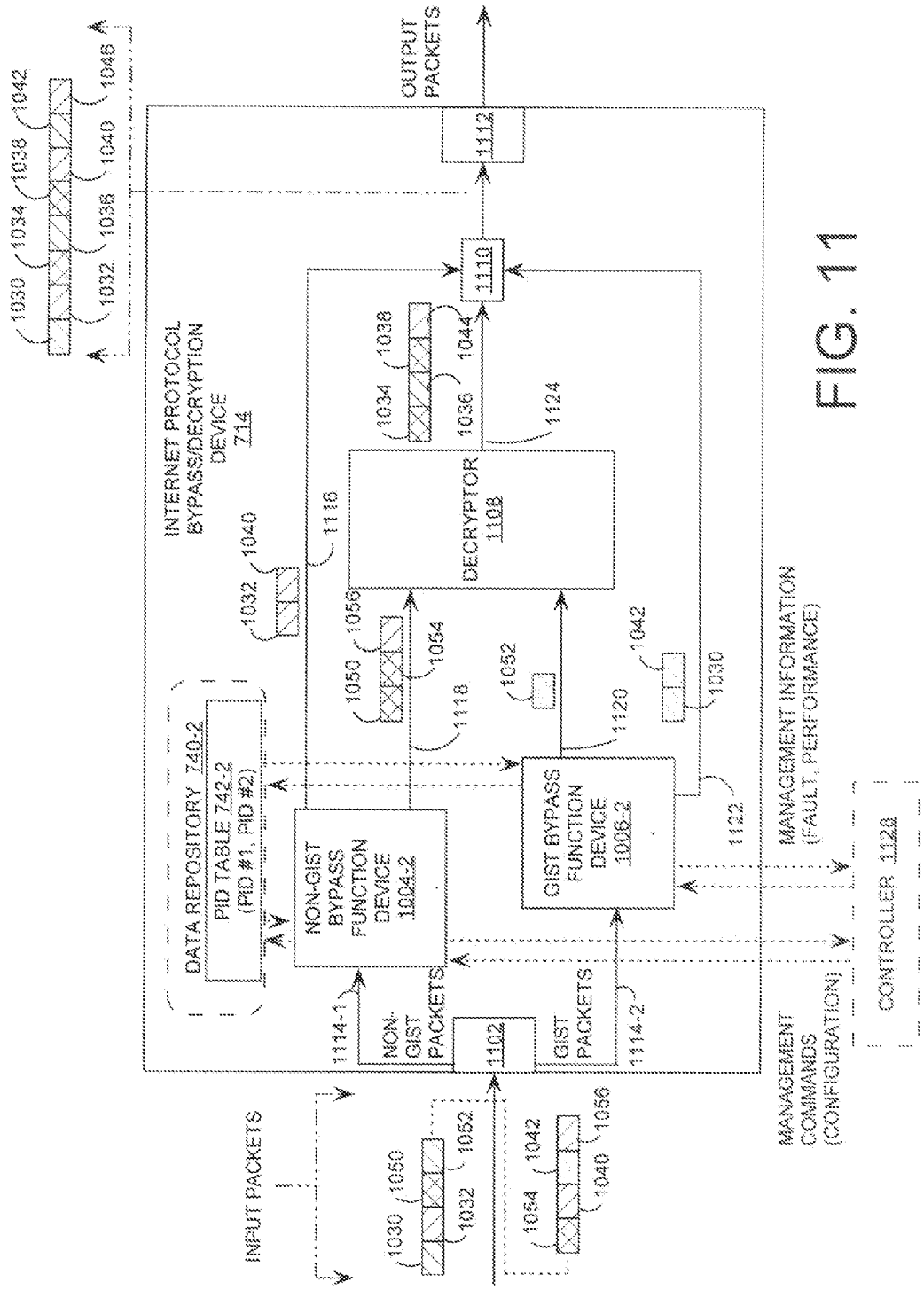
FIG. 11 is a block diagram of an internet protocol bypass/decryption device shown in FIG. 7 that is useful for understanding the invention.

Referring now to FIG. 11, there is provided a block diagram of an internet protocol bypass/decryption device 714 shown in FIG. 7. The bypass/decryption device 714 is comprised of interfaces 1102, 1112, a non-GIST bypass function device 1004-2, a GIST bypass function device 1006-2, a decryptor 1108, and a packet forwarding device 1110. The interface 1102 provides a means for the communication of input packets 1030, 1032, 1050, 1052, 1054, 1040, 1042, 1056 from a network 710 (shown in FIG. 7) to the bypass/decryption device 714.

As shown in FIG. 11, the interface 1102 is electrically connected to the non-GIST bypass function device 1004-2 via a data bus 1114-1. In this regard, the interface 1102 includes hardware and software configured to communicate packets 1032, 1040, 1050, 1054, 1056 to the non-GIST bypass function device 1004-2. It should be understood that the packets 1032, 1040, 1050, 1054, 1056 are non-GIST type packets 300 comprised of non-GIST signaling protocols and/or user data. It should also be appreciated that any method known in the art for determining if a packet is a non-GIST type packet 300 can be employed without limitation.

The interface 1102 is also electrically connected to the GIST bypass function devices 1006-2 via a data bus 1114-2. In this regard, the interface 1102 includes hardware and software configured to communicate packets 1030, 1042, 1052 to the GIST bypass function device 1006-2. It should be understood that the packets 1030, 1042, 1052 are GIST type packets 900 comprised of GIST signaling protocols and/or user data. It should also be appreciated that any method known in the art for determining if a packet is a GIST type packet 900 can be employed without limitation.

However, the invention is not limited in this regard. For example, the interface 1102 can alternatively perform actions for communicating all packets 1030, 1032, 1050, 1052, 1054, 1040, 1042, 1056 to the GIST bypass function device 1006-2 and the non-GIST bypass function device 1004-2. In such a scenario, the GIST bypass function device 1006-2 can perform actions to determine whether a packet is a GIST type packet 900. If a packet is a GIST type packet 900, then the GIST bypass function device 1006-2 can perform actions to determine whether the GIST type packet should be bypassed around the decryptor 1108. If the packet is not a GIST type packet 900, then the GIST bypass function device 1006-2 can perform actions to cease processing the packet, discard the packet, and continue to a next packet. The GIST bypass function device 1006-2 can then determine if the next packet is a GIST type packet 900. This process can be repeated for all packets 1030, 1032, 1050, 1052, 1054, 1040, 1042, 1056 received at the GIST bypass function device 1006-2.

Similarly, the non-GIST bypass function device 1004-2 can perform actions to determine whether a packet is a non-GIST type packet 300. If a packet is a non-GIST type packet 300, then the non-GIST bypass function device 1004-2 can perform actions to determine whether the non-GIST type packet should be bypassed around the decryptor 1108. If the packet is not a non-GIST type packet 300, then the non-GIST bypass function device 1004-2 can perform actions to cease processing the packet, discard the packet, and continue to a next packet. The non-GIST bypass function device 1004-2 can then determine if the next packet is a non-GIST type packet 300. This process can be repeated for all packets 1030, 1032, 1050, 1052, 1054, 1040, 1042, 1056 received at the non-GIST bypass function device 1004-2.

Referring again to FIG. 11, the non-GIST bypass function device 1004-2 is configured to receive a packet 1032, 1040, 1050, 1054, 1056 from the interface 1102. The non-GIST bypass function device 1004-2 is also configured to perform a bypass method. The bypass method includes initializing a protocol index of a data repository 740-2, querying the data repository 740-2 for at least one bypass PID, and receiving the at least one bypass PID from the data repository 740-2. The bypass method also includes de-encapsulating the packet 1032, 1040, 1050, 1054, 1056 at a data link layer 820, a network layer 818, and a transport layer 816. The bypass method further includes parsing a PID 350 (described above in relation to FIG. 3B) from a transport layer protocol header 306 (described above in relation to FIG. 3A and FIG. 3B), determining whether the PID 350 is equal to at least one bypass PID, and reconstructing the packet 1032, 1040, 1050, 1054, 1056. After the packet is reconstructed, it is either transmitted to the decryptor 1108 or the packet forwarding device 1110. For example, a packet including user data 1050, 1054 is forwarded to the decryptor 1108 via a data bus 1118. A packet including a non-bypass FID 1056 is also forwarded to the decryptor 1108 via a data bus 1118. A packet including a bypass PID 1032, 1040 is forwarded to the packet forwarding device 1110 via a data bus 1116. The bypass method is described in greater detail below (In relation to FIG. 12 and FIG. 13).

If should be appreciated that a controller 1128 can be advantageously provided for configurable management control of the non-GIST bypass function device 1004-2. Specifically, the controller 1128 can enable or disable the bypass function performed by the non-GIST bypass function device 1004-2 thereby providing flexibility in the configuration of the bypass/decryption device 714 and its functions. In this way, a smooth, controlled migration path to enable the bypass function is provided. Also, flexibility in other operational aspects such as handling of security alarms and troubleshooting is enhanced. Such an architecture provides a system for reconfiguration of the non-GIST bypass function device 1004-2 without adjusting or replacing its hardware and/or software components.

The GIST bypass function device 1006-2 is configured to receive a packet 1030, 1042, 1052 from the interface 1102. The GIST bypass function device 1006-2 is also configured to perform a bypass method. The bypass method includes de-encapsulating a packet 1030, 1042, 1052 at a data link layer 820, a network layer 818, and a transport layer 816. The bypass method also includes parsing a GIST signaling transport protocol identifier 960 from a transport layer protocol header 906. The bypass method further involves determining whether the GIST signaling transport protocol Identifier 960 is a NTLP or a NSIS signaling transport protocol identifier. For example, based on the current GIST specification, the GIST signaling transport protocol identifier 960 can be defined as a NTLP or a NSIS signaling transport protocol identifier if it matches (i.e., is equal to) a well known value assigned by the Internet Assigned Number Authority (IANA). After a determination is made, the packet 1030, 1042, 1052 is reconstructed, if the GIST signaling transport protocol identifier 960 is determined to be a NTLP or a NSIS signaling transport protocol identifier, then the packet 1030, 1042 is forwarded to the packet forwarding device 1110 via a data bus 1122, if the GIST signaling transport protocol identifier 960 is determined not to be a NTLP or a NSIS signaling transport protocol identifier, then the packet 1052 is forwarded to the decryptor 1108 via a data bus 1120. The bypass method is described in greater detail below (In relation to FIG. 12 and FIG. 14).

If should be appreciated that a controller 1128 can be advantageously provided for configurable management control of the GIST bypass function device 1006-2. Specifically, the controller 1128 can enable or disable the bypass function performed by the GIST bypass function device 1006-2 thereby providing flexibility in the configuration of the bypass/decryption device 714 and its functions. In this way, a smooth, controlled migration path to enable the bypass function is provided. Also, flexibility in other operational aspects such as handling of security alarms and troubleshooting is enhanced. Such an architecture provides a system for reconfiguration of the GIST bypass function device 1006-2 without adjusting or replacing its hardware and/or software components.

The decryptor 1108 is electrically connected to the non-GIST bypass function device 1004-2 via a data bus 1118. The decryptor 1108 is also electrically connected to the GIST bypass function device 1006-2 via a data bus 1120. In this regard, the decryptor 1108 performs actions involving the receipt of packets 1050, 1052, 1054, 1056 and the decryption of packets 1050, 1052, 1054, 1056. It should be appreciated that the decryptor 1108 includes hardware and software for decrypting packets in accordance with a particular network decryption application. For example, the decryptor 1108 can decrypt the data portion of a packet 1050, 1052, 1064, 1056. Alternatively, the decryptor 1108 can de-encapsulate at least one new header and frailer from a packet 1050, 1052, 1054, 1056. Subsequently, the decryptor 1108 can decrypt the remaining components of the packet 1050, 1052, 1054, 1056. In this regard, it should be understood that the decrypted packets 1034, 1036, 1038, 1044 correspond to the encrypted packets 1050, 1052, 1054, 1056, respectively. In accord with the bypass/decryption device 714 architecture of FIG. 11, the decryptor 1108 also includes hardware and software configured to communicate decrypted packets 1034, 1036, 1038, 1044 to the packet forwarding device 1110 via a data bus 1124.

The packet forwarding device 1110 is comprised of a circuit configured to arrange packets 1030, 1032, 1034, 1036, 1038, 1040, 1044, 1046 for transmission to the interface 1112. The interface 1112 provides a means for a serial transmission of packets 1030, 1032, 1034, 1036, 1038, 1040, 1044, 1046 to the EEUN 718 (shown in FIG. 7).

A person skilled in the art will appreciate that the bypass/decryption device 714 architecture is one embodiment of a bypass/decryption device. However, the invention is not limited in this regard and any other bypass/decryption device architecture can be used without limitation provided that it is designed to support a NSIS signaling transport protocol framework. In this regard, it should be understood that the bypass functions performed by the bypass/decryption device 714 are independent of the decryption method employed by the decryptor 1108. As such, the present invention can be used with any encryption method known in the art, such as an internet protocol security (IPSee) decryption method and a high assurance internet protocol decryption (HAIDP) method.

Figure 12:
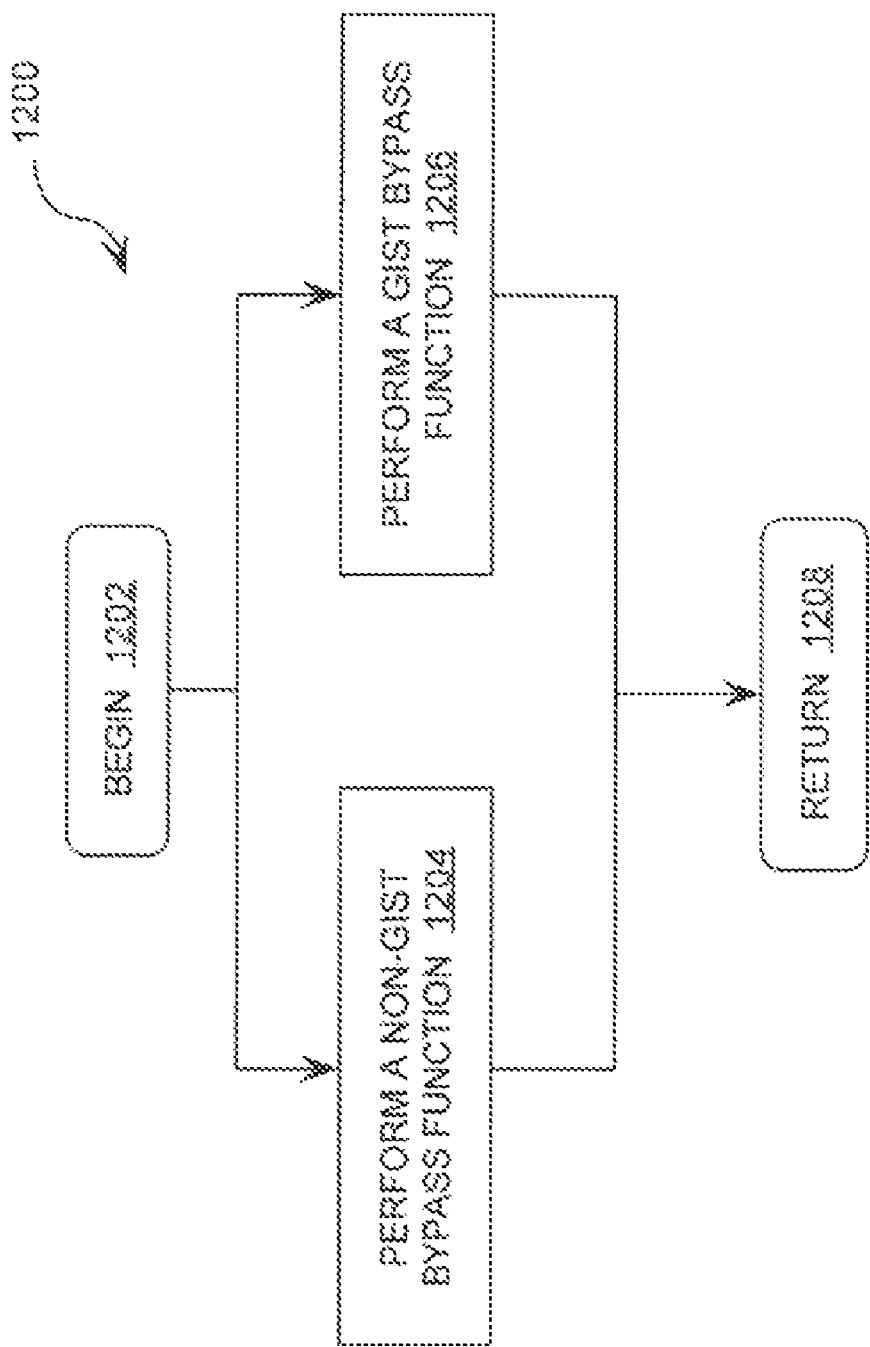
FIG. 12 is a flow chart of a bypass method performed by a bypass function device shown in FIGS. 10 and 11 that is useful for understanding the invention.

Referring now to FIG. 12, there is provided a flow chart of a bypass method 1200 performed by an internet protocol bypass/cryptographic device 706, 714 that is useful for understanding the invention. The bypass method 1200 begins with step 1202 and continues with step 1204 and step 1206. In step 1204, a non-GIST bypass function is performed. A method for performing the non-GIST bypass function is described in detail below (in relation to FIG. 13). In step 1206, a GIST bypass function is performed. A method for performing the GIST bypass function is described in detail below (in relation to FIG. 14). After performing the non-GIST and GIST bypass functions, control passes to step 1208 where the bypass method 1200 returns to step 1202.

A person skilled in the art will appreciate that the bypass method 1200 is one embodiment of a bypass method performed by an internet protocol bypass/cryptographic device 706, 714. The invention is not limited in this regard and any other bypass method can be used without limitation.

Figure 13:
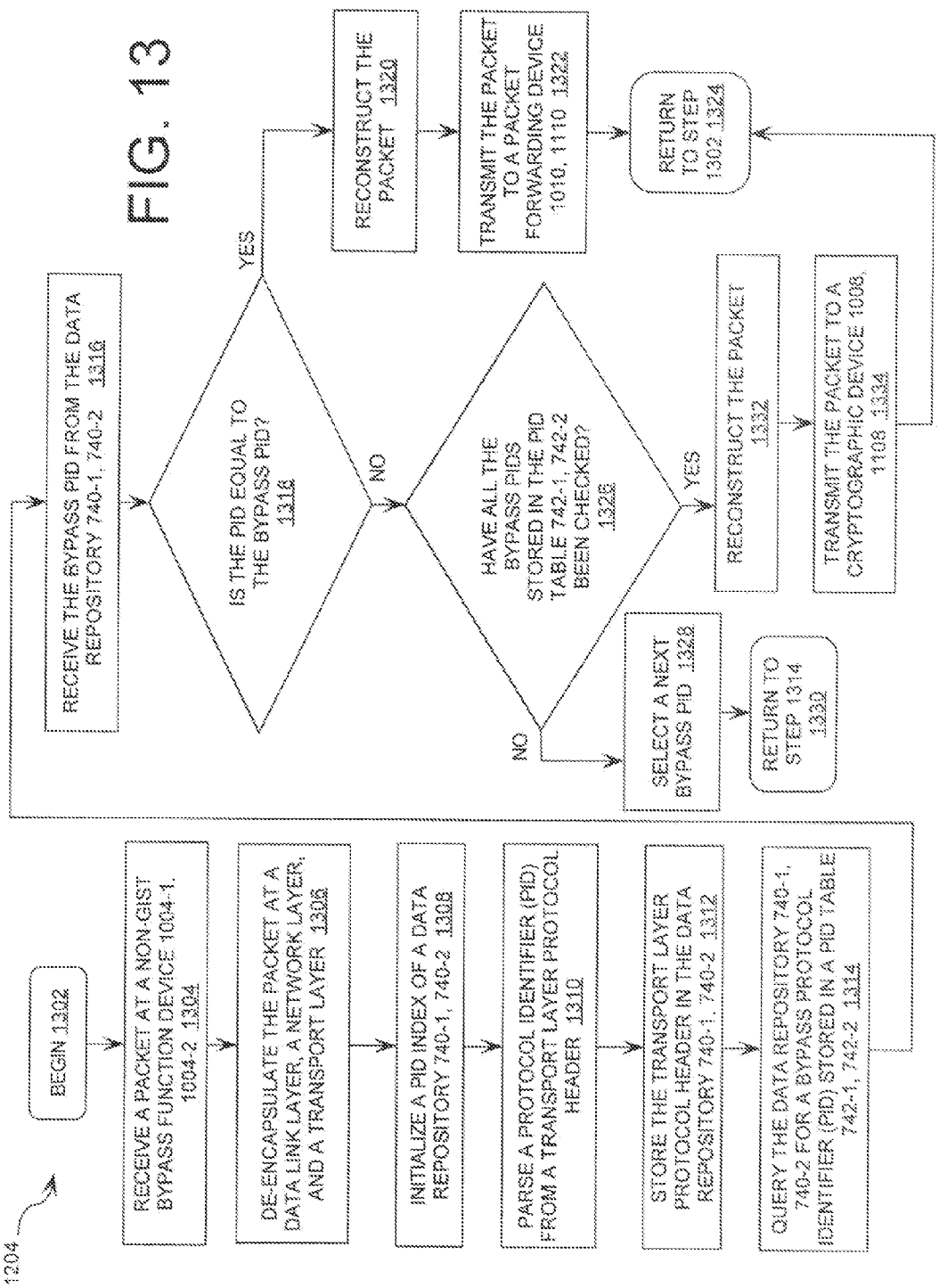
FIG. 13 is a flow chart of a non-GIST bypass method for the 'perform a non-GIST bypass function' step of FIG. 12 that is useful for understanding the invention.

Referring now to FIG. 13, there is provided a flow chart of a non-GIST bypass method 1204 for the 'perform a non-GIST bypass function' step of FIG. 12. The non-GIST bypass method 1204 begins at step 1302 and continues with step 1304. In step 1304, a packet is received at a non-GIST bypass function device 1004-1, 1004-2. Subsequently, the packet is de-encapsulated at a data link layer 208, a network layer 206, and a transport layer 204. This step can involve removing a data link layer protocol header, a data link layer protocol trailer, a network layer protocol header, a network layer protocol trailer, a transport layer protocol header, and a transport layer protocol trailer from the packet. Each of the listed headers and trailers are described above in relation to FIG. 3A. This step also involves storing the data link layer protocol header, data link layer protocol trailer, network layer protocol header, network layer protocol trailer, transport layer protocol header, and transport layer protocol frailer in a data repository 740-1, 740-2. After de-encapsulation of the packet, control passes to step 1308 where a PID index of a data repository 740-1, 740-2 is initialized. In step 1310, a PID 350 is parsed from a transport layer protocol header 306. The transport layer protocol header 306 is stored in the data repository 740-1, 740-2 for use in a packet reconstruction process. In step 1314, the non-GIST bypass function device 1004-1, 1004-2 queries the data repository 740-1, 740-2 for a bypass PID stored in a PID table 742-1, 742-2. In step 1316, the non-GIST bypass function device 1004-1, 1004-2 receives the bypass PID.

Upon receipt of the bypass PID, the bypass method 1204 continues with a decision step 1318, if the PID 350 is equal to the bypass PID (1318:YES), control passes to step 1320. In step 1320, the packet is reconstructed. This step involves re-encapsulating a saved end application protocol data unit within the transport layer protocol header 306, the transport layer protocol trailer 314, the network layer protocol header 304, the network layer protocol trailer 316, the data link layer protocol header 302, and the data link layer protocol frailer 318 successively in this order. After the packet is reconstructed, the non-GIST bypass function device 1004-1, 1004-2 transmits the packet to a packet forwarding device 1010, 1110. In step 1324, control returns to step 1302.

If the PID 350 is not equal to the bypass PID (1318:NO), control passes to a decision step 1326. If all the bypass PIDs stored in the PIP table 742-1, 742-2 have not been checked (1326:NO), the method 1204 continues with step 1323 where a next bypass PID is selected. Subsequently, control passes to step 1330 where the method 1204 returns to step 1314.

If all the bypass PIDs stored in the PID fable 742-1, 742-2 have been checked (1326:YES), the method 1204 continues with step 1332. In step 1332, the packet is reconstructed. This step involves re-encapsulating a saved end application protocol data unit within the transport layer protocol header 306, the transport layer protocol trailer 314, the network layer protocol header 304, the network layer protocol trailer 316, the data link layer protocol header 302, and the data link layer protocol trailer 318 successively in this order. After the packet is reconstructed, the non-GIST bypass function device 1004-1, 1004-2 transmits the packet to a cryptographic device 1008, 1108. After step 1334, control passes to step 1324 where the method 1204 returns to step 1302.

A person skilled in the art will appreciate that the non-GIST bypass method 1204 is one embodiment of a bypass method performed by a non-GIST bypass function device 1004-1, 1004-2. The invention is not limited in this regard and any other non-GIST bypass method can be used without limitation.

Figure 14:
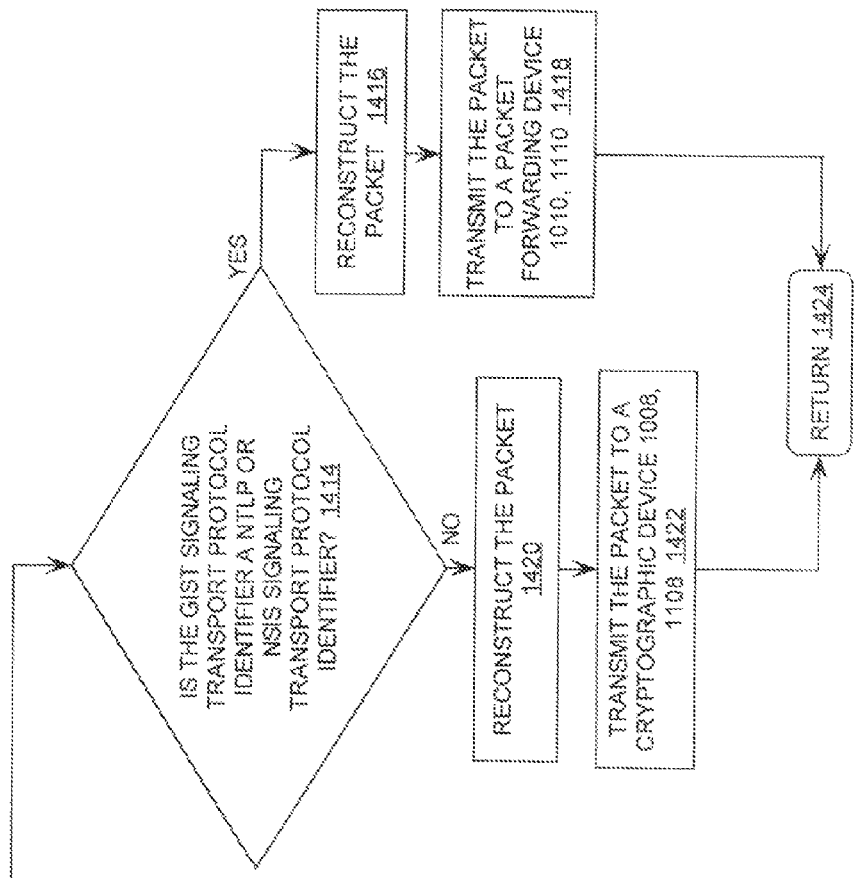
FIG. 14 is a flow chart of a GIST bypass method for the 'perform a GIST bypass function' step of FIG. 12 that is useful for understanding the invention.
Figure 14:
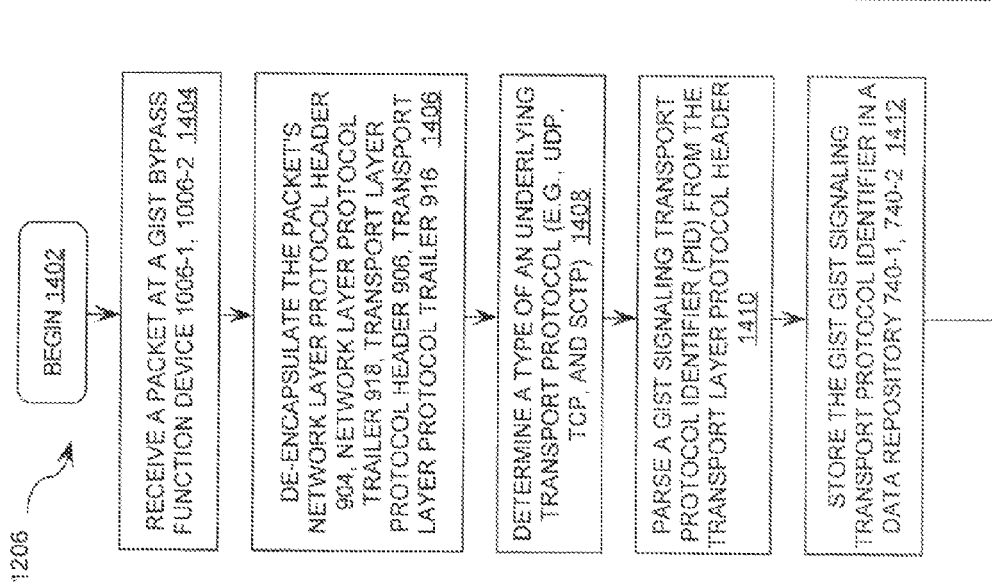

Referring now to FIG. 14, there is provided a flow chart of a GIST bypass method for the 'perform a GIST bypass function' step of FIG. 12. The bypass method 1206 begins at step 1402 and continues with step 1404. In step 1404, a packet is received at a GIST bypass function device 1006-1, 1006-2, which performs physical layer 822 and data link layer 820 processing. Upon receipt of the packet, the GIST bypass function device 1006-1, 1006-2 de-encapsulates the packet's network layer protocol header 904, network layer protocol trailer 918, transport layer protocol header 906, and transport layer protocol trailer 916. This step also involves storing the headers 904, 906 and trailers 918, 916 in a data repository 740-1, 740-2. After de-encapsulating the packet, control passes to step 1408. In step 1408, a type of underlying transport protocol (e.g., UDP, TCP, and SCTP) is determined. This step is performed for appropriately locating a GIST signaling transport protocol identifier 960 within a transport layer protocol header 906. For example, if the underlying transport protocol is a UDP, then the GIST signaling transport protocol identifier 960 would reside in a UDP header as a sixteen (16) byte value in a third or fourth byte of a first word of the UDP header. If the underlying transport protocol is a TCP, then the GIST signaling transport protocol identifier 960 would reside in a payload protocol identifier option field of a TCP header. Similarly, if the underlying transport protocol is a SCTP, then the GIST signaling transport protocol identifier 960 would reside in a payload protocol identifier field of a SCTP header.

After determining the type of the underlying transport protocol, step 1410 is performed. In step 1410, a GIST signaling transport protocol identifier 960 is parsed from the transport layer protocol header 906. In step 1412, the GIST signaling transport protocol identifier 980 is stored in the data repository 740-1, 740-2.

Thereafter, the bypass method 1206 continues with a decision step 1414. If the GIST signaling transport protocol identifier 960 is a NTLP or NSIS signaling transport protocol identifier (1414:YES), control passes to step 1416 where the packet is reconstructed. This step can involve re-encapsulating the GIST messaging layer protocol header 908, signaling data 911, and a GIST messaging layer protocol trailer 914 at the transport layer 816 and the network layer 818. After the packet is reconstructed, the GIST bypass function device 1006-1, 1006-2 transmits the packet to a packet forwarding device 1010, 1110. Subsequently, control passes to step 1424 where the bypass method 1206 returns to step 1402.

If the GIST signaling transport protocol identifier 960 is not a NTLP or NSIS signaling transport protocol identifier (1414:NO), control passes to step 1420 where the packet is reconstructed. This step can involve re-encapsulating the GIST messaging layer protocol header 908, signaling data 911, and a GIST messaging layer protocol trailer 914 at the transport layer 816 and the network layer 818. After the packet is reconstructed, the GIST bypass function device 1006-1, 1006-2 transmits the packet to a cryptographic device 1008, 1108. After step 1422, control passes to step 1424 where the bypass method 1206 returns to step 1402.

A person skilled in the art will appreciate that the bypass method 1206 is one embodiment of a bypass method performed by a GIST bypass function device 1006-1, 1006-2.

However, the invention is not limited in this regard and any other bypass method can be used provided that the GIST protocol identifier is used to determine whether a packet should be passed around a cryptographic device.

For example, if an underlying transport protocol is a UDP, then the bypass method 1206 can also include the following steps locate a destination port field value in a UDP transport layer protocol header 906, read the destination port field value from the UDP transport layer protocol header 906, and compare this destination port field value with a well-known GIST port number stored in a data repository 740-1, 740-2. If the destination port field value and the well-known GIST port number are a match, the packet is a NTLP packet and is bypassed around a cryptographic device 1006, 1106. If the destination port field value and the well-known GIST port number do not match, the packet is not a NTLP packet and is communicated to the cryptographic device 1006, 1106.

If an underlying transport protocol is a TCP, then the bypass method 1206 can also include the following steps locate a payload protocol identifier in a TCP transport layer protocol header 906, read the payload protocol identifier from the TCP transport layer protocol header 906, and compare the payload protocol identifiers value with a well known GIST protocol identifier value for a NTLP protocol. If the payload protocol identifier's value matched the well known GIST protocol identifier value, the packet was generated by NTLP and is bypassed around a cryptographic device 1006, 1106. If the payload protocol identifiers value does not match the well known GIST protocol identifier value, the packet was not generated by NTLP and is communicated to the cryptographic device 1006, 1106.

If an underlying transport protocol is a SCTP, then the bypass method 1206 can also include the following steps locate a payload protocol identifier in a SCTP transport layer protocol header 906, read the payload protocol identifier from the SCTP transport layer protocol header 906, and compare the payload protocol identifier's value with a well known GIST protocol identifier value. If the payload protocol identifier's value matched the well known GIST protocol identifier value, the packet is a NTLP packet and is bypassed around a cryptographic device 1006, 1106. If the payload protocol identifier's value does not match the well known protocol GIST identifier value, the packet is not a NTLP packet and is communicated to the cryptographic device 1006, 1106.

It should be appreciated that there are many advantages of the present invention. For example, packets including a non-GIST signaling protocol or a GIST signaling protocol can be bypassed around a cryptographic device at the same time. The present invention also provides a system 706, 714 with a controller 1028, 1128 that can enable or disenable a non-GIST bypass function device 1004-1, 1004-2 and/or a GIST bypass function device 1006-1, 1006-2. Such a system can support a network signaling framework migration from a conventional signaling framework to a hybrid signaling framework (i.e., a conventional signaling framework and a NSIS signaling framework) or a NSIS signaling framework (described above in relation to FIG. 8).

It should be appreciated that the bypass methods 1200, 1204, and 1206 can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

It should be further appreciated that the computer program code for carrying out the bypass routines and functions of the present invention can be written in an object orientated programming language such as Java®, Smalltalk, C++, or Visual Basic. However, the computer program code for carrying out the routines and functions of the present invention can also be written in conventional procedural programming languages, such as "C" programming language.

All of the apparatus; methods and algorithms disclosed and claimed herein can be made and executed without undue experimentation in light of the present disclosure. While the invention has been described in terms of preferred embodiments, if will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skied in the art are deemed to be within the spirit, scope and concept of the invention as defined.

I claim:

1. A system for a network signaling bypass around a cryptographic device, said system communicatively coupled between an ingress end user node and an egress end user node, said system comprising:
 a bypass/cryptographic device comprising an interface configured for
  receiving a plurality of packets each having a transport layer protocol header from said ingress end user node, and
  communicating at least said packets that are of a non-General Internet Signaling Transport (GIST) type to a non-GIST bypass circuit and at least said packets that are of a GIST type to a GIST bypass circuit;
 wherein said non-GIST bypass circuit is configured for selectively bypassing at least a first packet around said cryptographic device to an output device if said first packet comprises signaling protocol data for a network over which said first packet is communicated; and
 wherein said GIST bypass circuit is configured for
  determining a type of transport layer protocol used to transport at least a second packet,
  parsing a signaling transport protocol identifier for a signaling transport protocol from said second packet based on said type of said transport layer protocol,
  determining whether said signaling transport protocol identifier is a Next Step In Signaling (NSIS) Transport Level Protocol (NTLP) or an NSIS signaling transport protocol identifier, and
  bypassing said second packet around said cryptographic device to said output device if said signaling transport protocol identifier is determined to be an NTLP or an NSIS signaling transport protocol identifier.

2. The system according to claim 1, wherein said non-GIST bypass circuit is further configured for parsing a protocol identifier from a transport layer protocol header of each of said packets said non-GIST bypass circuit receives, and determining whether said protocol identifier is a signaling type protocol identifier.

3. The system according to claim 2, wherein said non-GIST bypass circuit is further configured for bypassing said first packet around said cryptographic device if said protocol identifier is said signaling type protocol identifier.

4. The system according to claim 2, wherein said non-GIST bypass circuit is further configured for communicating said first packet to said cryptographic device if said protocol identifier is not said signaling type protocol identifier.

5. The system according to claim 1, wherein said GIST bypass circuit is further configured for communicating said second packet to said cryptographic device if said signaling transport protocol identifier is not an NTLP or an NSIS signaling transport protocol identifier.

6. The system according to claim 1, wherein said GIST bypass circuit is further configured for de-encapsulating a data link layer protocol header of said second packet, a data link layer protocol trailer of said second packet, a network layer protocol header of said second packet, a network layer protocol trailer of said second packet, a transport layer protocol header of said second packet, and a transport layer protocol trailer of said second packet.

7. The system according to claim 6, wherein said GIST bypass circuit is further configured for re-encapsulating said second packet after determining whether said signaling transport protocol identifier is an NTLP or an NSIS signaling transport protocol identifier.

8. A method for bypassing network signaling packets around a cryptographic device communicatively coupled between an ingress end user node and an egress end user node, comprising:

receiving, at an interface of a bypass/cryptographic device, a plurality of packets that are of a General Internet Signaling Transport (GIST) type and a plurality of packets that are of a non-GIST type from said ingress end user node;

communicating at least said packets that are of a non-GIST type from said interface to a non-GIST bypass circuit and at least said packets that are of a GIST type to a GIST bypass circuit;

performing operations at said non-GIST bypass circuit for selectively bypassing around said cryptographic device to an output device said plurality of packets that are of said non-GIST type if said plurality of packets that are of said non-GIST type comprise signaling data for a network over which said plurality of packets are communicated;

determining, at said GIST bypass circuit, a type of transport layer protocol used to transport at least a first packet of said plurality of packets that are of said GIST type;

parsing, at said GIST bypass circuit, a signaling transport protocol identifier or a signaling transport protocol from said first packet based on said type of said transport layer protocol;

determining, at said GIST bypass circuit, whether said signaling transport protocol identifier is a Next Step In Signaling (NSIS) Transport Level Protocol (NTLP) or an NSIS signaling transport protocol identifier; and performing operations at said GIST bypass circuit for bypassing said first packet around said cryptographic device to said output device if said signaling transport protocol identifier is determined to be an NTLP or an NSIS signaling transport protocol identifier.

9. The method according to claim 8, further comprising parsing, at said non-GIST bypass circuit, a protocol identifier from a transport layer protocol header of each of said plurality of packets that are of said non-GIST type and determining whether said protocol identifier is a signaling type protocol identifier.

10. The method according to claim 9, further comprising bypassing a packet of said plurality of packets that are of said non-GIST type around said cryptographic device if said protocol identifier is a signaling type protocol identifier.

11. The method according to claim 9, further comprising communicating a packet of said plurality of packets that are of said non-GIST type to said cryptographic device if said protocol identifier is not a signaling type protocol identifier.

12. The method according to claim 9, further comprising de-encapsulating, at said non-GIST bypass circuit, each of said plurality of packets that are of said non-GIST type at a data link layer protocol header, a data link layer protocol trailer, a network layer protocol header, a network layer protocol trailer, a transport layer protocol header, and a transport layer protocol trailer.

13. The method according to claim 12, further comprising re-encapsulating, at said non-GIST bypass circuit, each of said plurality of packets that are of said non-GIST type after determining whether said protocol identifier is a signaling type protocol identifier.

14. The method according to claim 8, further comprising communicating said first packet to said cryptographic device if said signaling transport protocol identifier is not an NTLP or NSIS signaling transport protocol identifier.

15. The method according to claim 8, further comprising de-encapsulating, at said GIST bypass circuit, each of said plurality of packets that are of said GIST type at a data link layer protocol header, a data link layer protocol trailer, a network layer protocol header, a network layer protocol trailer, a transport layer protocol header, and a transport layer protocol trailer.

16. The method according to claim 15, further comprising re-encapsulating, at said GIST bypass circuit, each of said packets of said plurality of packets that are of said GIST type after determining whether said signaling transport protocol identifier is an NTLP or NSIS signaling transport protocol identifier.

* * * * *